United States Patent
Walker et al.

(10) Patent No.: US 9,508,220 B2
(45) Date of Patent: Nov. 29, 2016

(54) METHOD AND APPARATUS FOR INFLUENCING CASH OUTS FROM A GAMING DEVICE

(71) Applicant: IGT, Las Vegas, NV (US)

(72) Inventors: Jay S. Walker, Ridgefield, CT (US); Robert C. Tedesco, Fairfield, CT (US)

(73) Assignee: IGT, Las Vegas, NV (US)

( * ) Notice: Subject to any disclaimer, the term of this patent is extended or adjusted under 35 U.S.C. 154(b) by 255 days.

(21) Appl. No.: 14/043,020

(22) Filed: Oct. 1, 2013

(65) Prior Publication Data

US 2014/0031107 A1    Jan. 30, 2014

Related U.S. Application Data

(63) Continuation of application No. 11/348,045, filed on Feb. 6, 2006, now Pat. No. 8,550,900.

(51) Int. Cl.
*A63F 13/00* (2014.01)
*G07F 17/32* (2006.01)
*G03H 1/02* (2006.01)

(52) U.S. Cl.
CPC .......... *G07F 17/3244* (2013.01); *G07F 17/32* (2013.01); *G07F 17/3255* (2013.01); *G03H 1/028* (2013.01); *G03H 1/0244* (2013.01); *G03H 2270/13* (2013.01); *G03H 2270/52* (2013.01)

(58) Field of Classification Search
CPC .......... G07F 17/3244; G07F 17/3225; G07F 17/3239
USPC ......................... 463/16–20, 40–42
See application file for complete search history.

(56) References Cited

U.S. PATENT DOCUMENTS

| | | |
|---|---|---|
| 4,636,951 A | 1/1987 | Harlick |
| 4,679,143 A | 7/1987 | Hagiwara |
| 4,991,848 A | 2/1991 | Greenwood et al. |
| 5,179,517 A | 1/1993 | Sarbin et al. |
| 5,209,476 A | 5/1993 | Eiba |
| 5,249,800 A | 10/1993 | Hilgendorf et al. |
| 5,275,400 A | 1/1994 | Weingardt et al. |
| 5,277,424 A | 1/1994 | Wilms |

(Continued)

FOREIGN PATENT DOCUMENTS

| | | |
|---|---|---|
| GB | 2 161 008 | 1/1986 |
| WO | WO 8500910 | 2/1985 |

OTHER PUBLICATIONS

Website: "Golden Palace Online Casino", (http www goldenpalace com), copyright 1997-2003, 7pp.

(Continued)

*Primary Examiner* — Omkar Deodhar
*Assistant Examiner* — Eric M Thomas
(74) *Attorney, Agent, or Firm* — Neal, Gerber & Eisenberg LLP

(57) ABSTRACT

A gaming device is described that provides a number of different methods for cashing out credit balances from a gaming device. These methods include providing incentives, such as benefits, to a player for selecting particular monetary forms in which to receive the cash out. Non-preferred cash out forms may be associated with disincentives, such as penalties, to dissuade players from selecting these types of monetary transfers. In certain embodiments, incentives and disincentives may be associated with a variety of available monetary forms for cash out.

14 Claims, 19 Drawing Sheets

(56) References Cited

U.S. PATENT DOCUMENTS

| | | |
|---|---|---|
| 5,344,144 A | 9/1994 | Canon |
| 5,370,399 A | 12/1994 | Liverance |
| 5,371,345 A | 12/1994 | LeStrange et al. |
| 5,377,973 A | 1/1995 | Jones |
| 5,429,361 A | 7/1995 | Raven et al. |
| 5,450,938 A | 9/1995 | Rademacher |
| 5,470,079 A | 11/1995 | LeStrange et al. |
| 5,511,781 A | 4/1996 | Wood et al. |
| 5,559,312 A | 9/1996 | Lucero |
| 5,639,088 A | 6/1997 | Schneider et al. |
| 5,655,961 A | 8/1997 | Acres et al. |
| 5,674,128 A | 10/1997 | Holch et al. |
| 5,761,647 A | 6/1998 | Boushy |
| 5,770,533 A | 6/1998 | Franchi |
| 5,871,398 A | 2/1999 | Schneier et al. |
| 5,919,091 A | 7/1999 | Bell et al. |
| 5,967,896 A | 10/1999 | Jorasch et al. |
| 6,142,876 A | 11/2000 | Cumbers |
| 6,168,522 B1 | 1/2001 | Walker et al. |
| 6,319,125 B1 | 11/2001 | Acres |
| 6,371,852 B1 * | 4/2002 | Acres .................. G07F 17/3239 463/16 |
| 6,379,248 B1 | 4/2002 | Jorasch et al. |
| 6,431,983 B2 | 8/2002 | Acres |
| 6,511,377 B1 | 1/2003 | Weiss |
| 6,537,151 B1 | 3/2003 | Walker et al. |
| 6,549,912 B1 | 4/2003 | Chen |
| 6,554,709 B1 | 4/2003 | Brenner et al. |
| 6,595,855 B2 | 7/2003 | Sako |
| 6,607,441 B1 | 8/2003 | Acres |
| 6,743,097 B2 | 6/2004 | Walker et al. |
| 7,758,417 B2 | 7/2010 | Jorasch et al. |
| 2003/0073494 A1 * | 4/2003 | Kalpakian et al. .............. 463/42 |
| 2005/0003887 A1 * | 1/2005 | Seelig ..................... G07F 17/32 463/25 |
| 2005/0227760 A1 * | 10/2005 | Vlazny et al. .................. 463/28 |
| 2006/0068898 A1 * | 3/2006 | Maya ...................... G07F 17/32 463/25 |

OTHER PUBLICATIONS

Website: "Golden Palace Casino", (http www inspace net/~ragoczy/gambling/goldenplace htm), dowload date: Mar. 16, 1998, 3pp.

"Registered VIP Cashout", Crazy Eights Casino, (http //207 112 121 5/html/cashout htm), download dated: Mar. 16, 1998.

Moran, John M., "Future Currency to Take the Shape of Bits Instead of Bills", The Hartford Courant, Oct. 13, 1996, Section: Main, p. A 1.

PCT International Search Report for Application No. PCT/US99/07440, dated Jun. 11, 1999.

* cited by examiner

| OUTCOME 502 | RANDOM NUMBER 504 | EXPECTED HITS PER CYCLE 506 |
|---|---|---|
| NONWINNING COMBINATION | 1-8570 | 8570 |
| CHERRY/ANY/ANY | 8571-9250 | 680 |
| ANY/ANY/CHERRY | 9251-9930 | 680 |
| CHERRY/CHERRY/ANY | 9931-10130 | 200 |
| ANY/CHERRY/CHERRY | 10131-10330 | 200 |
| CHERRY/ANY/CHERRY | 10331-10398 | 68 |
| CHERRY/CHERRY/CHERRY | 10399-10418 | 20 |
| BAR/ORANGE/ORANGE | 10419-10460 | 42 |
| ORANGE/ORANGE/BAR | 10461-10466 | 6 |
| ORANGE/ORANGE/ORANGE | 10467-10508 | 42 |
| BAR/PLUM/PLUM | 10509-10528 | 20 |
| PLUM/PLUM/BAR | 10529-10533 | 5 |
| PLUM/PLUM/PLUM | 10534-10583 | 50 |
| BAR/BELL/BELL | 10584-10587 | 4 |
| BELL/BELL/BAR | 10588-10607 | 20 |
| BELL/BELL/BELL | 10608-10627 | 20 |
| BAR/BAR/BAR | 10628-10647 | 20 |
| 7/7/7 | 10648 | 1 |

FIG. 8

| | OUTCOME 552 | AWARD AMOUNT 554 |
|---|---|---|
| 555 | | |
| 556 | NONWINNING COMBINATION | 0 |
| 558 | CHERRY/ANY/ANY | 2 |
| 560 | ANY/ANY/CHERRY | 2 |
| 562 | CHERRY/CHERRY/ANY | 5 |
| 564 | ANY/CHERRY/CHERRY | 5 |
| 566 | CHERRY/ANY/CHERRY | 5 |
| 568 | CHERRY/CHERRY/CHERRY | 20 |
| 570 | BAR/ORANGE/ORANGE | 10 |
| 572 | ORANGE/ORANGE/BAR | 10 |
| 574 | ORANGE/ORANGE/ORANGE | 20 |
| 576 | BAR/PLUM/PLUM | 14 |
| 578 | PLUM/PLUM/BAR | 14 |
| 580 | PLUM/PLUM/PLUM | 20 |
| 582 | BAR/BELL/BELL | 18 |
| 584 | BELL/BELL/BAR | 18 |
| 586 | BELL/BELL/BELL | 20 |
| 588 | BAR/BAR/BAR | 50 |
| | 7/7/7 | 100 |

| | | NON-BANKROLL BALANCE | | BANKROLL BALANCE | | CASINO ACCOUNT BALANCE | |
|---|---|---|---|---|---|---|---|
| | OUTCOME 602 | RANDOM NUMBER 645 | EXPECTED HITS PER CYCLE 650 | RANDOM NUMBER 655 | EXPECTED HITS PER CYCLE 660 | RANDOM NUMBER 665 | EXPECTED HITS PER CYCLE 670 |
| 608 | NONWINNING COMBINATION | 1-8570 | 8570 | 1-8562 | 8562 | 1-8546 | 8546 |
| 610 | CHERRY/ANY/ANY | 8571-9250 | 680 | 8563-9242 | 680 | 8547-9226 | 680 |
| 612 | ANY/ANY/CHERRY | 9251-9930 | 680 | 9243-9922 | 680 | 9227-9906 | 680 |
| 614 | CHERRY/CHERRY/ANY | 9931-10130 | 200 | 9923-10122 | 200 | 9907-10106 | 200 |
| 616 | ANY/CHERRY/CHERRY | 10131-10330 | 200 | 10123-10322 | 200 | 10107-10306 | 200 |
| 618 | CHERRY/ANY/CHERRY | 10331-10398 | 68 | 10323-10394 | 72 | 10307-10386 | 80 |
| 620 | CHERRY/CHERRY/CHERRY | 10399-10418 | 20 | 10395-10414 | 20 | 10387-10406 | 20 |
| 622 | BAR/ORANGE/ORANGE | 10419-10460 | 42 | 10415-10456 | 42 | 10407-10448 | 42 |
| 624 | ORANGE/ORANGE/BAR | 10461-10466 | 6 | 10457-10462 | 6 | 10449-10454 | 6 |
| 626 | ORANGE/ORANGE/ORANGE | 10467-10508 | 42 | 10463-10506 | 44 | 10455-10502 | 48 |
| 628 | BAR/PLUM/PLUM | 10509-10528 | 20 | 10507-10526 | 20 | 10503-10522 | 20 |
| 630 | PLUM/PLUM/BAR | 10529-10533 | 5 | 10527-10531 | 5 | 10523-10527 | 5 |
| 632 | PLUM/PLUM/PLUM | 10534-10583 | 50 | 10532-10581 | 50 | 10528-10577 | 50 |
| 634 | BAR/BELL/BELL | 10584-10587 | 4 | 10582-10585 | 4 | 10578-10581 | 4 |
| 636 | BELL/BELL/BAR | 10588-10607 | 20 | 10586-10605 | 20 | 10582-10601 | 20 |
| 638 | BELL/BELL/BELL | 10608-10627 | 20 | 10606-10625 | 20 | 10602-10621 | 20 |
| 640 | BAR/BAR/BAR | 10628-10647 | 20 | 10626-10647 | 22 | 10622-10647 | 26 |
| 642 | 7/7/7 | 10648 | 1 | 10648 | 1 | 10648 | 1 |

FIG. 10

| OUTCOME 702 | NON-BANKROLL BALANCE 744 | BANKROLL BALANCE 746 | CASINO ACCOUNT BALANCE 748 |
|---|---|---|---|
| NONWINNING COMBINATION | 0 | 0 | 0 |
| CHERRY/ANY/ANY | 2 | 2 | 2 |
| ANY/ANY/CHERRY | 2 | 2 | 2 |
| CHERRY/CHERRY/ANY | 5 | 5 | 5 |
| ANY/CHERRY/CHERRY | 5 | 5 | 5 |
| CHERRY/ANY/CHERRY | 5 | 5 | 5 |
| CHERRY/CHERRY/CHERRY | 20 | 20 | 20 |
| BAR/ORANGE/ORANGE | 10 | 10 | 10 |
| ORANGE/ORANGE/BAR | 10 | 10 | 10 |
| ORANGE/ORANGE/ORANGE | 20 | 20 | 20 |
| BAR/PLUM/PLUM | 14 | 14 | 14 |
| PLUM/PLUM/BAR | 14 | 14 | 14 |
| PLUM/PLUM/PLUM | 20 | 20 | 20 |
| BAR/BELL/BELL | 18 | 18 | 18 |
| BELL/BELL/BAR | 18 | 18 | 18 |
| BELL/BELL/BELL | 20 | 20 | 20 |
| BAR/BAR/BAR | 50 | 60 | 70 |
| 7/7/7 | 100 | 120 | 130 |

FIG. 11

| PLAYER ID 1610 | SOCIAL SECURITY NUMBER 1612 | NAME 1614 | ADDRESS 1616 | PHONE NUMBER 1618 | CREDIT CARD NUMBER 1620 |
|---|---|---|---|---|---|
| 123456 | 123-45-7890 | BILL GREEN | 111 NORTH AVE. | (212) 555-1234 | 1111-2222-3333-4444 |
| 876543 | 876-54-3210 | ROB BLUE | 423 SOUTH ST. | (812) 555-4321 | 2222-4444-6666-8888 |
| 158505 | 555-12-6338 | KAREN RED | 64 WEST RD. | (315) 555-5364 | 1111-3333-5555-7777 |

| CREDIT BALANCE 1622 | (ACCUMULATED) COMP. POINTS 1624 | HOTEL GUEST 1626 | PLAYER RATING 1628 | CASINO ACCOUNT 1630 | BANK ACCOUNT 1632 |
|---|---|---|---|---|---|
| $25.00 | 130 PTS. | NO | 4 | $15.54 | NONE |
| $17.50 | 240 PTS. | YES | 2 | NONE | NONE |
| $0.00 | 350 PTS. | YES | 2 | $160.00 | ACCT. # 54376 |

FIG. 16

| CASH OUT ID 1705 | CASH OUT TYPE 1710 | FEE(S) 1715 | BONUS 1720 | ELIGIBLE CASHOUT VALUE(S) 1725 |
|---|---|---|---|---|
| O-1A | CASH OUT IN COIN | $1.00 | NO BONUS AVAILABLE | ≥ $10.00 |
| O-1B | CASH OUT IN COIN | 0 | NO BONUS AVAILABLE | < $10.00 |
| O-2 | CASH OUT WITH A TICKET | 0 | PLAYER LOYALTY POINT BONUS EQUAL TO CREDIT BALANCE | ANY VALUE |
| O-3 | CASH OUT TO PLAYER LOYALTY ACCOUNT | 0 | PLAYER LOYALTY POINT BONUS EQUAL TO CREDIT BALANCE AND 5% BONUS ON THE CASH OUT CREDIT VALUE | ANY VALUE |
| O-4A | CASH OUT TO FINANCIAL ACCOUNT | $25.00 TRANSFER FEE | NO BONUS AVAILABLE | < $100.00 |
| O-4B | CASH OUT TO FINANCIAL ACCOUNT | $25.00 TRANSFER FEE | PLAYER LOYALTY POINT BONUS EQUAL TO CREDIT BALANCE | ≥ $100.00 |

METHOD AND APPARATUS FOR INFLUENCING CASH OUTS FROM A GAMING DEVICE

PRIORITY CLAIM

This application is a continuation of, claims priority to and the benefit of U.S. patent application Ser. No. 11/348,045, filed on Feb. 6, 2006, the entire contents of which is incorporated by reference herein.

RELATED APPLICATIONS

This application is related to commonly owned: U.S. patent application Ser. No. 09/052,667, filed on Mar. 31, 1998, entitled, METHOD AND APPARATUS FOR OPERATING A GAMING DEVICE TO DISPENSE A SPECIFIED AMOUNT, now U.S. Pat. No. 6,168,522; and U.S. patent application Ser. No. 10/829,420, filed on Apr. 21, 2004, entitled, METHOD AND APPARATUS FOR OPERATING A GAMING DEVICE TO DISPENSE A SPECIFIED AMOUNT, now U.S. Pat. No. 6,932,704; the content of each of these applications is hereby incorporated by reference in its entirety.

FIELD

Various embodiments are described that generally relate to gaming devices and more specifically to gaming devices and different forms of disbursed monetary output.

BACKGROUND

A conventional gaming device, such as a slot machine, video poker machine or video blackjack machine, typically requires a player to establish an initial "balance" by providing the gaming device with monetary input. For example, the player may insert currency (bills, coins and/or tokens) into the gaming device. Alternatively, the player may have funds transferred to the gaming device from an account, such as a credit card account or casino account that is identified by a card inserted into the gaming device. Once a balance is established, it is available for initiating a play of the gaming device.

The player then selects a wager amount which is subtracted from the balance (i.e., the wager amount is "drawn" from the balance), and initiates a play by pulling a handle or pressing a pushbutton on the gaming device. For example, the player may select a wager amount of three coins from a balance of ten coins. In response, the gaming device generates a game outcome (e.g., "CHERRY/CHERRY/CHERRY" for a slot machine) and a corresponding award amount that is based on the game outcome. The award amount may be zero for unfavorable game outcomes, or a greater amount for more favorable outcomes. Typically, greater award amounts correspond to more unlikely game outcomes. The balance is increased by the award amount, thereby generating an adjusted balance that is available for initiating a subsequent play of the gaming device.

After any number of such plays, the player may direct the gaming device to dispense the adjusted balance, thereby providing the player with monetary output. Dispensing typically includes activating a hopper in the gaming device to dispense currency to the player. Some gaming devices alternatively transfer the dispensed amount to a credit card account or other account (electronic casino account, personal financial account, etc.); thereby eliminating the need for the player to hold and carry dispensed currency. After cashing out, the balance of the gaming device is zero, and another initial balance must be established before subsequent plays of the gaming device may be initiated.

If a player establishes a relatively large initial balance, he can enjoy many plays before the balance diminishes and more monetary input is required to continue. However, if the player establishes a relatively small initial balance, he must continually provide monetary input after each few plays. A player that establishes a small balance is likely to maintain a small balance during subsequent plays. He is in turn likely to "cash out" (have the balance dispensed as currency) if his award amounts increase the balance significantly.

Many players prefer to establish small balances, thereby retaining as much currency as possible. Players may do so in order to maintain physical control over theft currency by holding it in their pocket or in a bucket. In addition, it is more convenient to retain currency for uses such as purchasing food or drinks from a cocktail server, tipping a cocktail server, or providing a companion with currency. In addition, it is inconvenient for the player to have to cash out each time a player leaves the gaming device (e.g., to get a drink, visit another player, or go to a rest room). Players may also worry that a power loss or similar electronic mishap will adversely affect the balance stored in the gaming device.

Conversely, casinos prefer that players establish large balances. Each time a player cashes out, he may decide to stop playing, particularly given the need to re-supply the gaming device with more monetary input. Further, the time spent dispensing the entire balance to the player and re-supplying the gaming device with monetary input is time during which no plays can occur. Accordingly, such time represents lost profits to the casino. In addition, dispensing currency exerts wear and tear on various components of the gaming device, and may eventually require repair and/or replacement of those components. Similarly, it is expensive for a casino to handle the vast amount of currency that is collected in its gaming devices. The casino must expend considerable resources in collecting, counting and moving coins, bills and tokens.

Casinos also prefer that players play from a large initial balance, rather than from repeatedly-inserted currency. Players tend to perceive a balance as somewhat less valuable than a corresponding amount of currency. Accordingly, players are more likely to continue playing as long as a balance remains, especially if the balance eventually decreases to a relatively small value. For example, if a gaming device with a minimum wager amount of $0.25 has a balance of $3, the typical player is more likely to play until the balance is reduced to zero, rather than cash out.

For similar reasons, casinos prefer that players use a casino account, rather than use currency or credit card accounts. Players that have a casino account have an incentive to continue playing at that casino rather than another. Further, while a player maintains a balance in a casino account, the casino has access to those funds and may, for example, derive interest payments therefrom. Even when funds are withdrawn from a casino account, they are used in a gaming device, and thereby become revenue for the casino.

Accordingly, when a player maintains a large balance or uses a casino account, the player essentially commits himself to a long session of play. The longer he plays, the greater the expected profit of the casino. Unfortunately, many players do neither. Conventional gaming devices do not provide any incentive for either maintaining a large balance or using a casino account.

BRIEF DESCRIPTION OF THE DRAWINGS

FIG. 8 is an exemplary schematic illustration of a probability schedule of a gaming device of FIG. 3.

FIG. 9 is an exemplary schematic illustration of a payout schedule of a gaming device of FIG. 3.

FIG. 10 is a schematic illustration of another embodiment of a probability schedule.

FIG. 11 is a schematic illustration of another embodiment of a payout schedule.

FIG. 16 is an embodiment of the player database of FIG. 1 with exemplary entries.

FIG. 17 is an embodiment of a cash out database of FIG. 1 with exemplary entries.

DETAILED DESCRIPTION OF SOME EMBODIMENTS

Figure 1:
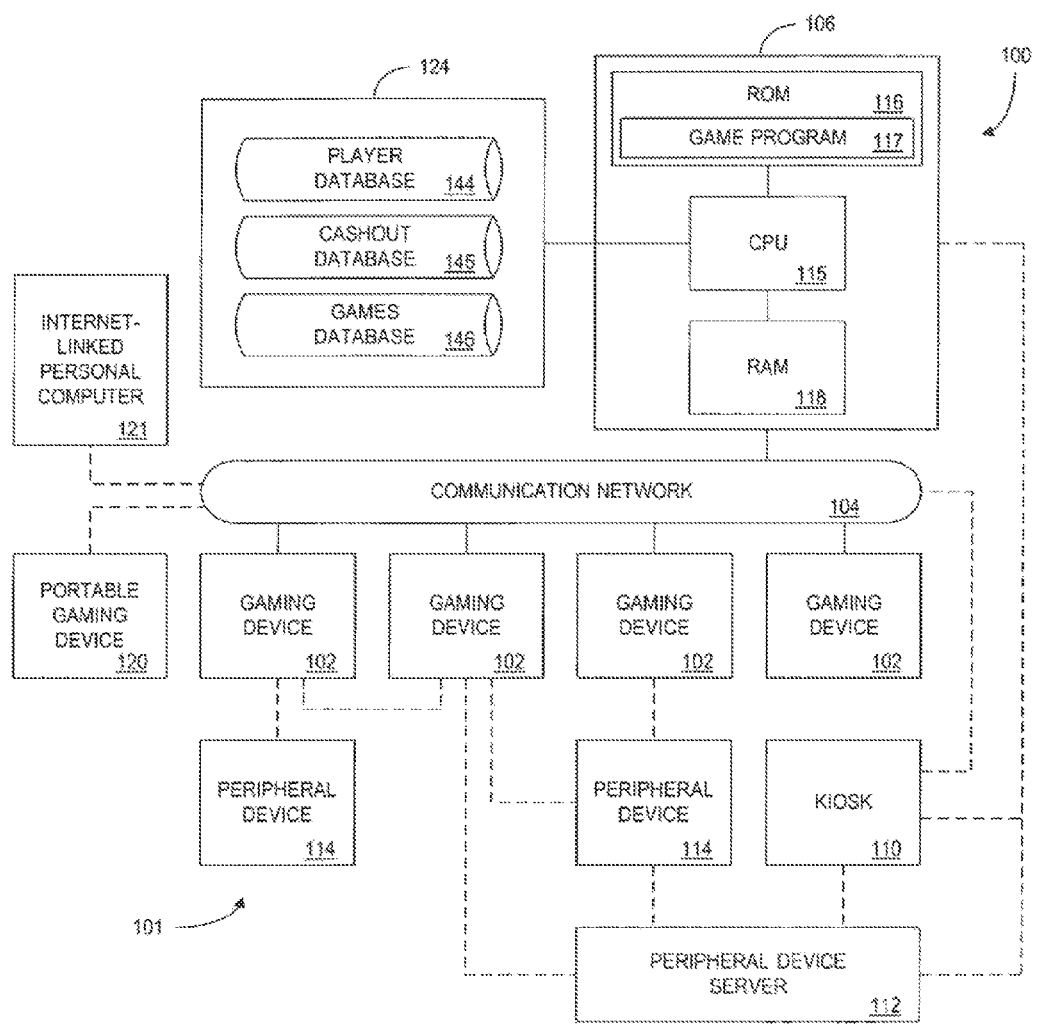
FIG. 1 is an overall schematic illustration of one embodiment of a network of gaming devices.

In one embodiment, a gaming device is described that includes a plurality of separate balances for storing monetary units from which a wager may be deducted or form which the player may cash out of the gaming device. For example, the gaming device receives monetary input, such as currency or a transfer from an account, and in turn increases one or more balances. The balance increased depends on criteria such as, for example, the amount of monetary input or the source of monetary input (e.g., from a casino account). Players may draw wager amounts from different balances, and add award amounts to the balances. Incentives (or disincentives) may be provided in some embodiments for use of certain balances. For example, different balances may have different payout schedules, different probability schedules, or both for wagers made from these balances.

To avoid or minimize overhead expenses associated with cashing out a balance from a gaming device, the gaming establishment may provide incentives for the player to cash out remaining balances using specified monetary forms. In addition, incentives may be provided to the player for selecting cash out forms that promote continued wagering or return trips to the gaming establishment. By providing appropriate cash out incentives, a player may be influenced to select a cash out form that minimizes the cost of the cash out to the casino and/or promote additional wagering.

or example, when the player provides the gaming device with monetary input, a balance is selected and that balance is adjusted by the monetary input. The balance may be selected based on various criteria. For example, different sources or amounts of monetary input may determine a specific balance.

Drawing a wager amount from different balances provides the player with different gaming experiences. Consequently, there are different incentives for players to use the balances. For example, drawing a wager amount from a particular balance may provide a higher probability of a more favorable game outcome, or may provide a higher award amount for a particular game outcome. Accordingly, the player has an incentive to establish and draw from that balance.

In other embodiments, only a single balance available for wagering may be established. In either a multiple-balance or a single balance embodiment, however, one or more incentives may be provided to a player to encourage the player to select a cash out (either all or a portion of the balance) in one form versus another (e.g., a player may be provided with an incentive to transfer the credits from the balance in the gaming device to a casino account via Electronic Funds Transfer (EFT) instead of receiving a cash out in coin).

When a player decides to end a gaming session, the player cashes out to receive the player's winnings or remaining credits. The form of cash out, from either one balance (in the case of the single balance embodiment) or multiple balances (in the case of a multiple balance embodiment), may be selectively determined from a plurality of monetary forms. The player's selection of a particular monetary form in which to receive a cash out may be influenced by incentives. These incentives may be benefits to increase the appeal of a particular monetary form. Disincentives, such as penalties may be used to decrease the appeal of a particular form. Thus, the incentive may be to select a monetary form that is not associated with a fee for receiving a cash out in a particular monetary form. If desired a combination of benefits and penalties (e.g., fees) may be associated with a plurality of different monetary forms to influence the selection of a particular monetary form.

For example, to discourage cash out in coin, a flat fee may be associated with each cash out in coin requested. To encourage cash outs with cashless ticket vouchers, a player may receive player loyalty points as a bonus. A cash out menu may be providing that compares each of these different types of cash out forms, including their respective fees and bonuses, to provide a player with a comprehensive review that facilitates the selection of a particular monetary form—generally the monetary form providing the greatest benefit and least detriment to the player.

From the perspective of the gaming establishment, the most desirable monetary form for cash outs is one that minimizes the overhead costs (e.g., ticket printing, coin handling) associated with a cash out. In addition, it is highly desirable, from the gaming establishment's perspective to provide a cash out in a monetary form that promotes further wagering at the gaming establishment. From the player's perspective, the most desirable cash out form is one that provides convenience and security.

The following description provides an analysis of both the monetary inputs to establish a plurality of balances to enable wagering on a gaming device, as well as methods for cashing out the credit balances on the gaming device to end the wagering session. The following description also includes methods for cashing out of a gaming device with a single balance (e.g., a credit meter) in which the monetary form of the cash out can be selected. Accordingly, a gaming device with a single credit meter may provide a cash out in a plurality of different monetary forms, at least one of the monetary forms associated with a benefit (bonus) or penalty (expense).

The following paragraphs take these processes and explains them in the context of gaming device operation—from the establishment of a balance to initiate wagering to cashing out the balance at the end of the wagering session. The explanation of these processes begins with a description, in one embodiment, of the gaming device and the network on which the gaming device may operate.

Referring now to FIG. 1, illustrated therein is an example embodiment of a gaming network 100 that may be used to implement one or more embodiments generally described above. The gaming network 100 of FIG. 1 includes a plurality of network devices 101 that are directly or indirectly in communication with the gaming network 100 to accept wagers, determine game outcomes, and provide payouts for winning game outcomes. Among these network devices 101 are a gaming server 106 (that is in communication with one or more other network devices), a gaming device 102 (e.g., video slot machines, video poker machines, mechanical reel slot machines), a kiosk 110, a merchant point-of-sale (POS) terminal (not shown), a peripheral device server 112, various component devices (e.g., display screens) (not shown), various peripheral devices 114 associated with the gaming device (e.g., card readers), a portable gaming device 120 (e.g., a PDA or cell phone), and an Internet linked personal computer 121. These devices and their functions are described in detail below.

Each gaming device 102, and every other network device 101 in the gaming network 100 that communicates with another network device in the gaming network, is uniquely identified by a device identification (ID) number, to allow communication with the gaming server 106 via the gaming network 100. The gaming network 100 may communicate with devices directly or indirectly, via a wired or wireless medium to a communication network 104 such as the Internet, LAN, WAN or Ethernet, Token Ring, or via any appropriate communications means or combination of communications means. It is to be understood, however, that other arrangements in which the gaming devices 102 communicate with the server 106 are also possible.

A variety of communications protocols may be part of the system, including but not limited to: Ethernet (or IEEE 802.3), SAP, SAS, SUPERSAS, ATP, BLUETOOTH, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device 102 and various component devices and/or peripheral devices 114 (e.g., printers, bill acceptors, etc.), (ii) the Best of Breed (BOB) standard, which may facilitate communication between a gaming device 102 and various servers 106 related to play of one or more gaming devices (e.g., servers that assist in providing accounting, player-tracking, content management, ticket-in/ticket-out and progressive jackpot functionality), and/or (iii) the System-to-System (S2S) standard, which may facilitate communication between game-related servers 106 and/or casino property management servers (e.g., a hotel server comprising one or more databases that store information about booking and reservations). Communication may be encrypted to ensure privacy and prevent fraud in any of a variety of ways well known in the art.

The gaming device 102 may be implemented as a system server, a dedicated hardware circuit, an appropriately programmed general-purpose computer, or any other equivalent electronic, mechanical, or electro-mechanical device. The gaming device 102 may comprise any or all of the gaming devices of the aforementioned systems.

In some embodiments, a gaming device 102 may comprise a portable gaming device 120—for example, a portable or "handheld" gaming device (e.g., a device similar to a PDA) or a cell phone that may be used in place of, or in addition to, some or all of the gaming device and/or its components. The portable gaming device 120 may be used to view "walk away" game outcomes from a gaming device 102. Methods for viewing walk away game outcomes are described in Applicants' U.S. Pat. No. 6,012,983, filed Dec. 30, 1996, entitled "AUTOMATED PLAY GAMING DEVICE" and U.S. Pat. No. 6,964,611, filed Aug. 15, 2001 entitled "SYSTEM AND METHOD FOR AUTOMATED PLAY OF LOTTERY GAMES" the entirety of each are incorporated herein by reference for all purposes.

In this situation, the portable gaming device 120 is in communication with the gaming device 102 in the gaming network 100. Game outcomes are automatically generated by the gaming device 102 and communicated to the player on the portable gaming device 120. In a central determination system, game outcomes from the server may be communicated directly to the player's portable gaming device 120. Either system allows the player the convenience of receiving and viewing game outcomes anywhere in the gaming establishment Further, a gaming device 102 may comprise an Internet linked personal computer 121 that may be operable to communicate with an online casino and facilitate game play at the online casino. In one embodiment, the Internet linked personal computer 121 may receive game outcomes produced by a gaming device 102 in the gaming establishment similar to the portable gaming device 120 described above. In one embodiment, the gaming server 106 communicates the game outcomes received from a player's gaming device 102 to the player's personal computer 121.

The peripheral device server 112 may be available to provide additional communication capabilities between peripheral devices 114 in the gaming network 100. These peripheral devices 114 may include player-tracking devices, additional screen displays, ticket readers and printers, etc.

In some embodiments, a kiosk 110 may be configured to execute or assist in the execution of various processes of the gaming network 100. In some embodiments, a kiosk 110 may comprise a processor and a memory. A kiosk 100 may also comprise various input devices (e.g., a keypad, a keyboard, a mouse, pushbuttons, a port that receives player tracking cards, an optical scanner for reading bar codes or other indicia, a CCD camera, etc.), output devices (e.g., a display screen, audio speakers, etc.), benefit output devices (e.g., a coin tray or printer for printing ticket tickets), combinations thereof (e.g., a "in/ticket-out" device, a touch-sensitive display screen, etc.), communications ports, and so on. Thus, a kiosk 110 may comprise many of the features and components of a gaming device 102, though the kiosk itself may not necessarily be configured to enable gambling activity as a primary function. A kiosk may communicate with any or all of (i) a gaming server 106, (ii) a gaming device 102, (iii) an inventory/reservation system of a casino-maintained property (e.g., a hotel), (iv) casino personnel devices, (v) merchant POS terminals, and so on. A number of kiosks 110 may be stationed within casino premises (e.g., at various locations on a slot floor).

In various embodiments, kiosks may execute or assist in the execution of (i) determining and outputting a player status or other types of data described herein (e.g., a kiosk receives a player tracking card, and provides a description of the player's redeemable awards), (ii) outputting payments to players (e.g., upon receipt of cash-less gaming vouchers, player tracking cards, account identifiers, smart cards, etc.), (iii) receiving "deposits" of funds from players to be stored in an account (e.g., casino account, financial account), (iv) transferring balances from one type of account to another type of account, and/or (v) any other process described herein. Thus, such a device may be configured to read from and/or write to one or more databases. The memory of such a device may store a program for executing such processes.

The kiosk 110 may be available for allowing a player to customize the gaming experience or cash out game winnings (e.g., retrieve winnings from an account). The kiosk 110 may also be available to the player for purchasing flat-rate gaming sessions, purchasing goods and services with player loyalty points.

The gaming device 102, the kiosk 110, and the peripheral device server 112 as well as all other network devices 101 are in communication with the gaming server. The gaming server 106 will now be described in detail with reference to FIG. 1. Like the gaming device 102, the gaming server 106 has a central processing unit CPU 115. The server executes the instructions of a program 117 stored in Read Only Memory (ROM) 116 and executed from Random Access Memory RAM 118. Additionally, the CPU 115 is coupled to a data storage device 124, having a plurality of databases.

In order to communicate with gaming devices 102 and/or another device, the gaming server 106 also includes a communication port. The communication port connects the server CPU 115 to the gaming device 102. Thus, the CPU 115 of the gaming server 106 can control the communication port to receive information from the data storage device 124 and transmit information to the gaming device 102 and vice versa.

The player database 144 may serve as one example of the communication capability of the communication network 104 to exchange data between the gaming server 106 and the gaming device 102. The player database 144 may be used to store data associated with specific players that are members of a gaming establishment's player loyalty program. The player database 144 stores player wagering data that can be converted into loyalty points and accumulated in the player's account.

These player loyalty programs reward players with complementary points as players wager on the gaming establishment's gaming devices. These loyalty points are generally redeemable for gifts and other discounts on goods and services, especially those offered by the gaming establishment.

The player database 144 may alternately or additionally store various other data associated with a player, such as the type of game or gaming device a player is currently playing or has played, the length of time a player has played a certain game or machine, information regarding wins and losses (e.g., a total amount won/lost for a given period of time, consecutive wins/losses, percentage of all plays that are wins/losses, etc.).

The player database 144 may also contain information that may be useful for satisfying player needs (e.g., information about the player's gaming preferences (such as which games the player prefers and/or under what conditions the player prefers one method of cash out or one type of balance to draw funds from over another), gaming sessions, outstanding debts, lodging arrangements, and the like). For example, the player database 144 may store data regarding a given player's standing in a game session or bonus game, so that the player can continue the game session or bonus game at one of a plurality of gaming devices that have common access to the player database 144.

As will be described in detail below, in one embodiment, the player tracking system operates through gaming device 102 to communicate a player's identifying information to the gaming server 106. The gaming server 106, in turn, collects statistical data regarding the player's game play (e.g., wagering activity). Player data may be stored in a relational database and retrieved or otherwise accessed by the CPU 115 after receiving a "key" data point from the player, such as a unique identifier read from the player's player-tracking card or cash-less gaming voucher, PIN or code entered by a player using an input device of the gaming device 102, etc. It is contemplated that players may also identify themselves in a variety of other manners, such as by providing biometric identifiers, RFID identity devices, etc.

The player database 144 of the present embodiment may include multiple records having multiple fields of information. For example, FIG. 16 illustrates an embodiment of a player database 1600 as an example of the player database 144 illustrated in FIG. 1 with exemplary entries. The player database 1600 comprises multiple records, each record being associated with a particular player, as identified by player identification (ID) number 1610. The fields within each record include player identification (ID) number 1610, Social Security number 1612, name 1614, address 1616, telephone number 1618, credit card number 1620, credit balance 1622, accumulated complimentary points 1624, whether the player is a hotel guest 1626, and player status rating 1628.

The player database 1600 may also have a pointer to a database containing information related to a player's casino account 1630 from which a player may establish a balance on a gaming device. The player database 1600 may also contain a pointer to a database containing information regarding a player's financial account 1632. Alternatively, information to access both the casino account 1630 and the institutional bank account 1632 may be available on the player tracking database and associated with a player tracking identifier 1610. Having information related to one field, such as player ID 1610, allows the gaming server to retrieve all information stored in corresponding fields of that player record.

For example, in one embodiment, the player may be identified by his player tracking card, allowing the central server to retrieve information from the player database 1600 regarding the player's casino account or other financial account. This information may include fields identifying a financial institution, account number, and appropriate wiring instructions to enable the gaming device to automatically wire a credit balance to the financial institution for deposit in the player specified account.

Various systems for facilitating such monitoring are contemplated. For example, a two-wire system such as one offered by International Gaming Systems (IGT) may be used. Similarly, a protocol such as the IGT SAS™ or SuperSAS™ protocol may be used. The SAS™ and Super-SAST™ protocols allow for communication between gaming devices and slot accounting systems and provide a secure method of communicating all necessary data supplied by the gaming device to the online monitoring system. One advantage of the SAS™ and SuperSAS™ protocols is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that monitors slot machines and customer gaming activity. Thus, for example, any one of these systems may be used to monitor a player's gaming activity in order to determine player outcomes, coin-in statistics, win/loss statistics and/or any other data deemed relevant.

Turning back to FIG. 1, the gaming network 100 may have a data storage device 124 for storing the player database 144 as well as storing other types of data in a number of databases. Examples of such databases include, but are not limited to, (i) a games database 146 that stores game software for a plurality of games playable on and/or downloadable to one or more gaming devices 102; and, (ii) a cash out database 145 to determine the cash out offers and/or options available to a player when a cash out signal is received. In some embodiments, the gaming server 106 may also contain a payout database and a probability database associated with the games available on the game's database. The ability to store games and associated probability and payout tables on the gaming server 106 allow this embodiment to perform most gaming operations on the gaming server 106 and only download game outcomes to the gaming device 102 as explained in detail below.

It is to be understood that because the gaming devices 102 are in communication with the gaming server 106, information stored in a gaming device 102 may be stored in the gaming server 106 and vice versa. Thus, for example, in an alternate embodiment, the gaming device 102, rather than the data storage device 124 may store one or more of these databases. In other embodiments, some or all of these databases may be partially or wholly stored in another network device 101, such as in a peripheral device server 112, a kiosk 110, the gaming server 106, or other gaming devices 102, etc.

It will be understood by one of ordinary skill in the art that (i) alternative database structures to those described herein may be readily employed; and (ii) other memory structures (e.g., a hierarchical electronic file system) besides databases may be readily employed. Any schematic illustrations and accompanying descriptions of any sample databases presented herein are illustrative arrangements for stored representations of information. Any number of other arrangements may be employed besides those suggested by the tables shown.

Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes described herein. In addition, the databases may, in a known manner, be stored locally or remotely from a device, that accesses data in such a database.

With the communication network 104 and access to data from the data storage device 124, the gaming server 106 may be operable to configure (or reconfigure) a gaming device 102 remotely, update software stored on a gaming device 102 and for to download software or software components to a gaming device 102. For example, a database (e.g., a payout or probability database) stored in the memory of gaming device 102 may be altered, modified, or updated remotely, hot fixes may be applied to software stored by the gaming device 102, and/or new software may be downloaded to the gaming device. Game software may be downloaded as needed to provide specific games desired by a player in real time. Similarly, the gaming device 102 may be programmed to retrieve any or all such updates from another device.

Gaming server 106 may be programmed (e.g., with program 117) to perform any or all of the above functions based on, for example, an occurrence of an event (e.g., a scheduled event), satisfying a condition, receiving an indication from a qualified casino employee and/or other person (e.g., a regulator), receiving a request from a player, and/or the satisfaction of a condition stored in a reconfiguration database 148.

It should be noted that embodiments using a server to determine game outcomes may be advantageous in environments or jurisdictions wherein the "central determination" of outcomes is required by regulation or otherwise preferred. Thus, for example, outcomes may be determined centrally by a game server, and then propagated (e.g., electronically) such that indications of the outcomes may be viewed using one or more gaming devices (e.g., "Class II" gaming devices, "thin-client" gaming devices in a server-based "Class III" gaming architecture, Video Lottery Terminals, and so on).

In this embodiment, the gaming device 102 essentially comprises a thin client device controlled by the gaming server 106. The gaming server 106 may determine game outcomes for each of the gaming devices 102 and transmit those game outcomes (including associated graphics and audio data in some embodiments) to the gaming device 102. Multiple instances of the same game may be transmitted to different players on different gaming devices (i.e., the same game on the server 106 may be producing different game outcomes for different players playing at the same time at different gaming devices). In some embodiments, a plurality of game outcomes may be transmitted from the gaming server 106 to a gaming device 102 substantially simultaneously, pursuant to play of a game series.

Figure 2:
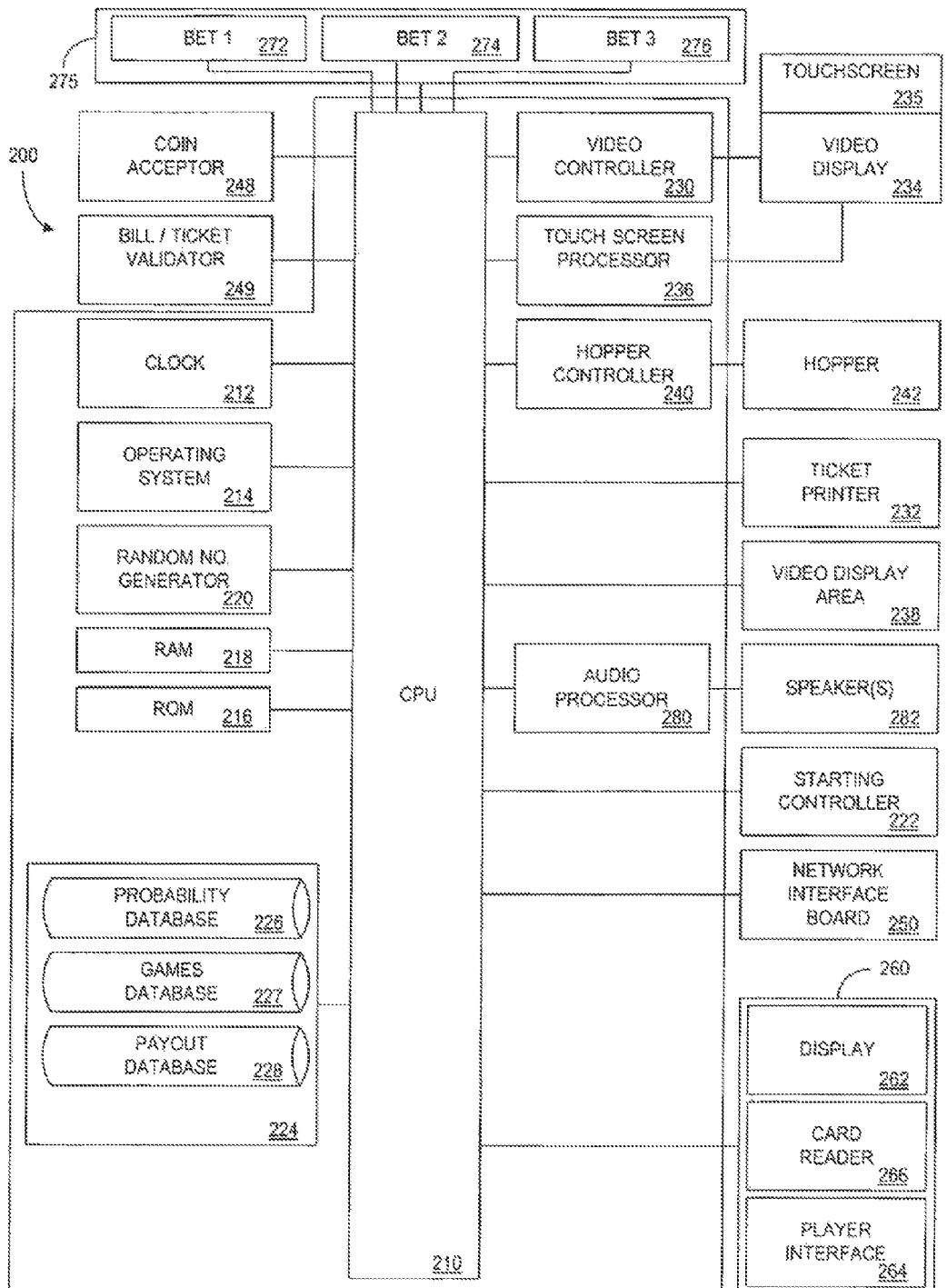
FIG. 2 is an exemplary block diagram of the gaming device of FIG. 1.

Referring now to FIG. 2, illustrated therein is one embodiment of a block diagram for a gaming device 200. The gaming device 200 may be an embodiment of a gaming device 102 shown in FIG. 1. The gaming device 200 has a CPU 210, which is communication with the communication network 104 of FIG. 1 through a network interface board 250. The network interface board 250 provides a communication path from the gaming device 200 to gaming server 106 through the gaming network 100. Thus, as discussed in detail below, information can be communicated between the gaming device 200 through its CPU 210 to the gaming server 106. In addition, the player-tracking device 260 and its associated player interface 264 (e.g., a keypad) which is also in communication with the gaming device's CPU 210, may provide a communications link between the player and the gaming device 200 or even the gaming server 106 through the gaming device's 200 CPU 210.

With respect to some gaming operations, the gaming device 200 may operate in a conventional manner. The player starts the gaming device 200, for example, by inserting a coin into the coin acceptor 248 or a bill into the bill validator 249. A starting controller 222 may initiate operation of the gaming device 102 to produce a random game outcome.

The gaming device 200 contains a Central Processing Unit (CPU) 210 that executes instructions of a program 214 stored in Read Only Memory (ROM) 216 for playing the gaming device 200. The CPU 210 performs instructions of the program 214 and thereby operates to perform in accordance with the methods described in detail herein. The program 214 may be stored in a compressed, uncompiled, and/or encrypted format. The program 214 may also include program elements that may be necessary, such as an operating system, a database management system and "device drivers" for allowing the processor to interface with computer peripheral devices.

According to one embodiment, the instructions of the program may be read into a main memory (e.g., Random Access Memory (RAM) 218) from another computer-readable medium such as from a ROM 216. The system bus carries the data to main memory, from which the CPU 210 retrieves and executes the instructions. The instructions received by main memory may optionally be stored in memory either before or after execution by the CPU 210. RAM 218 may also temporarily store information communicated to it by the CPU 210 during game play.

Execution of sequences of the instructions in program 214 causes CPU 115 to perform the process steps described herein. In alternate embodiments, hard-wired circuitry may be used in place of, or in combination with, software instructions for implementation of the reconfiguration process. Thus, the various embodiments are not limited to any specific combination of hardware and software.

The CPU 210 and the memory 216 and 218 may each be, for example: (i) located entirely within a single computer or other device; or (ii) connected to each other by a remote communication medium, such as a serial port cable, telephone line, or radio frequency transceiver. In one embodiment, the gaming device 200 may comprise one or more devices that are connected to a remote server for maintaining databases.

Under control of a program stored, for example ROM 216, the CPU 210 initiates the RNG 220 to generate a random number. The random number generator 220, in accordance with at least one embodiment, may generate data representing random or pseudo-random values (referred to as "random numbers" herein).

The random number generator 220 may generate a random number, for example, every predetermined unit of time (e.g., every thousandth of a second) or in response to an initiation of a game on the gaming device 102. In the former embodiment, the generated random numbers may be used as they are generated (e.g., the random number generated at substantially the time of game initiation is used for that game) and/or stored for future use. A random number generated by the random number generator 220 may be used by the CPU 210 to determine, for example, at least one of an outcome and payout.

A random number generator 220, as used herein, may be embodied as a secondary processor, separate from, but working in cooperation with the CPU 210. Alternatively, the random number generator 220 may be embodied as an algorithm, program component, or software program stored in the memory of the gaming device 200 and used to generate a random number. Note that, although the generation or obtainment of a random number is described herein as involving a random number generator 220 of a gaming device 200, other methods of determining a random number may be employed.

For example, a gaming establishment may obtain sets of random numbers that have been generated by another entity. For example, there are services that provide random numbers that have been generated by timing successive pairs of radioactive decays detected by a Geiger-Muller tube interfaced to a computer.

As would be understood by one of ordinary skill in the art, a random number generator 220 may be stored in a device other than a gaming device 200. For example, in some embodiments, a gaming device 200 may receive random numbers and/or any other data related to the random or pseudo-random determination of an outcome from a separate device, such as the gaming server 106 shown in FIG. 1. In fact, the gaming server 106 (and/or the data storage device 124) may contain not only the random number generator 220, but also the probability and pay table databases necessary to determine a winning game outcome, and the payout award for such a winning game outcome. This arrangement might be implemented in a thin-client type gaming device (i.e., a "dumb" terminal or "smart-enough" terminal).

The CPU 210 as shown in FIG. 2 looks up the generated random number in a stored probability database 226, which contains a list that matches random numbers to corresponding game outcomes to determine a game outcome based on the generated random number.

A probability database 226 may be stored in the gaming device's 200 ROM 216 or in any other data storage device. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator 220; and (ii) an outcome that indicates the one or more indicia comprising the outcome that corresponds to the random number of a particular record. These indicia comprise the game outcome that is then displayed to the player in the primary video display 234.

The indicia representing the game outcome may comprise reel symbols commonly displayed on the reels of slot type gaming devices. The indicia may also be cards from a card deck displayed on the video display on a video poker gaming device. For example, the book "Winning at Slot Machines" by Jim Regan (Carol Publishing Group Edition, 1997) illustrates examples of payout and probability tables and how they may be derived. The entirety of this book is hereby incorporated by reference herein for all purposes.

In an alternate embodiment, rather than using a video display to present indicia, mechanical reels with indicia on the circumference of the reel may be spun and randomly stopped to present a game outcome in a window of the gaming device. The CPU 210 determines the game outcome based on the random number selected by the random number generator. The CPU 210 is in communication with a reel controller that controls the motion of the reels. The reel controller 324 causes the reels to spin and stop at a combination of reel positions corresponding to the game outcome.

Based on the identified game outcome, the CPU 210 locates the appropriate payout in a payout database 228. The payout database 228 may be stored in the gaming device's 200 RAM 218 (alternatively, the payout database may also be stored in any other data storage device).

A payout database 228 may store a number of entries associated with each possible game outcome represented by the indicia determined by the probability table. The tabular representation defines fields for each of the entries or records. The fields specify: (i) an outcome, which indicates the one or more indicia comprising a given outcome, and (ii) a payout that corresponds to each respective outcome.

The outcomes may be those obtained from winning game outcomes typically obtainable on a video poker gaming device (e.g., royal flush, straight flush, straight, four-of-a-kind, full house, two pair, three-of-a-kind, and pair). With the payout database 228, the payout of any winning game outcome can be determined. Alternatively, game outcomes may be represented by reel symbols; with winning game outcomes determined by the order and type of symbol as presented in the display.

The described entries of the probability database 226 and the payout database 228 represent exemplary information only; those skilled in the art will understand that the number and content of the entries can be different from those illustrated herein. Further, despite any description of the databases as tables, an object-based model could be used to store and manipulate the data types and likewise, object methods or behaviors can be used to implement the processes described herein.

In addition to determining a game outcome, the CPU 210 controls a variety of peripheral devices associated with the gaming device that may be used to assist the player in making wagers and receiving payouts. The CPU 210 is operable to communicate (e.g., via a protocol such as GDS) with these various peripheral devices associated with the gaming device 102.

The following is a description of some of these peripheral devices that are available in gaming devices 200. These peripheral devices may be classified as either input devices (e.g., player input to gaming device), output devices (e.g., gaming device output to player), or interface devices that have both input and output type characteristics. It should be understood that not all of the peripheral devices are necessary, and further, that the peripheral devices may be used in any combination, including using a plurality of the same peripheral device in a single gaming device 200.

Some examples of input devices include wager acceptors, for initiating game play on the gaming device 200, such as the coin acceptor 248. A coin acceptor 248 is coupled to the CPU 210. Each coin received by the coin acceptor 248 is registered by the CPU 210. A hopper controller 240 is connected to a hopper 242 for dispensing the collected coins when a winning game outcome occurs. In addition, when the player requests to cash out by pushing a cash out pushbutton (not shown) on the gaming device 200, the CPU 210 checks the RAM 218 to see if the player has any credit and, if so, signals the hopper controller 240 to release an appropriate number of coins into a payout tray (not shown).

Another type of wager acceptor is the bill/ticket validator 249. The bill/ticket validator accepts either paper currency or ticket vouchers. This voucher operates similarly to cash and is generally accepted by most gaming devices 200 in the gaming establishment with a bill/ticket validator 249.

The voucher may be printed by a ticket printer 232 located in the gaming device 200. For example, when a player cashes out, instead of accepting payment in coin, the player may request a ticket voucher. The credit balance (i.e., balance) on the credit meter of the gaming device 200 before the cash out request is indicated on the ticket voucher.

In accordance with at least one embodiment, if it desired to encourage a player to accept payment via a ticket rather than in coin or another monetary form, the monetary value printed on the ticket may be greater than the value of the credit balance based on which the ticket is printed. For example, assuming that a gaming device reflects a credit balance value of $13.75, upon a player requesting to cash out the balance, a ticket voucher is printed in the amount of $15.13 (a 10% benefit for accepting payment via a ticket voucher). In other words, the additional 10% increase from the displayed credit balance is the incentive provided to a player who accepts payment via a ticket. The ticket voucher generally contains a bar code and other legible indicia that indicate the gaming establishment and the monetary value of the voucher.

The bar code on the voucher is machine-readable by the bill/ticket validator 249. The player simply inserts the voucher (as the player would for paper currency) into the bill/ticket validator 249 and the value of the voucher is determined. The gaming device 200 communicates with a gaming server 106 (shown in FIG. 1) that manages the accounting associated with such ticket-in/ticket-out transactions (e.g., to track the issuance, redemption and expiration of such vouchers). An example of such ticket-in/ticket-out technology, the EZ PAY system, is manufactured by International Gaming Technology, headquartered in Reno, Nev. The monetary value of the voucher is displayed on the gaming device's credit meter and is available for wagering. Other forms of payment may be available including the use of credit cards, debit cards, smart cards, credits/currency from electronic accounts (e.g., a player 'downloads' credits from a central server), etc. to make wagers. As described herein, in some embodiments a player may be provided with an incentive to use a particular monetary form to establish a credit balance over another form (e.g., an incentive such as a more favorable payout table may be provided to a player who establishes a credit balance via an electronic account rather than via insertion of coins or bills).

Also in communication with the CPU 210 is a player-tracking device 260. The CPU 210 is in turn in communication with a server 106 (shown in FIG. 1) that contains the player database 144. The player-tracking device 260 has a card reader 266 as shown in FIG. 2, which accepts a player-tracking card for reading player-identifying information stored on a player-tracking card (e.g., a player identification (ID) number). Although not so limited, the player-tracking card of the present embodiment stores the player ID on a magnetic strip located thereon. Alternatively, any player identifying indicia may be used, including biometric indicia.

The player-tracking device 260 has a player-tracking display 262 and a player interface 264 that allows the gaming device 200 and/or server 106 to communicate with the player. The player interface 264 may include a keypad and/or a touch-screen display.

Other examples of input devices that facilitate game play include the pushbutton panel 275. The pushbutton panel 275 allows the player to make various choices including wager amounts and games selections. The gaming device 200 also includes a plurality of bet pushbuttons 272, 274, 276. The bet pushbuttons include "Bet 1 coin" 272, "Bet 2 coins" 274, and "Bet 3 coins" 276. The bet pushbuttons 272, 274, 276 are coupled to the CPU 210. Therefore, a pushbutton transmits a signal to the CPU 210 indicating how much a player is wagering on a given play. Other examples of input devices include keypads, microphones, and video camera may be in communication with the CPU 210 or with the player-tracking device 260.

The CPU 210 may also be operable to communicate with various output devices. In some embodiments, an output device comprises a game display. The primary video display 234 may comprise, for example, one or more display screens or areas for outputting information related to game play on the gaming device 200, such as a cathode ray tube (CRT) monitor, liquid crystal display (LCD) screen, and/or light emitting diode (LED) screen.

In one or more embodiments, a gaming device 200 may comprise more than one game display. For example, a gaming device 200 may comprise an LCD display for displaying images of reels (or card hands in the case of a video poker gaming device) (e.g., a primary video display 234) and a display area that displays rotating mechanical reels.

Alternately, a gaming device 200 may have a video display 234 for the outcome of a primary game played on the gaming device and a secondary video display 238 may display rules for playing a game of the gaming device, the outcome of secondary games played in conjunction with the primary game, and various other games being offered to a player, and so on.

The CPU 210 may also be in communication with one or more other output devices. Such devices may comprise, for example, a primary video display 234 through a video controller 230, an audio speaker 282 through an audio processor 280; headphones; an infrared transmitter; a radio transmitter; an electric motor, etc. The CPU 210 may also be in communication with a wireless portable gaming device 120 (shown in FIG. 1) that may receive in some embodiments game outcomes from gaming device 200.

Another type of output device is required to pay off winning game outcomes. For example, the coin hopper 242 may pay out coins from the gaming device or a ticket voucher may be provided for a winning game outcome. In yet another example, the gaming device 200 may credit a monetary amount to an account associated with a player as a pay out provided to a player. The account may be, for example, a credit card account, a debit account, a charge account, a checking account, or a casino account (e.g., an account from which the player may access cashable and/or non-cashable funds using a player tracking card or smart card).

A gaming device 200 may also include a touch screen 235 and a touch screen processor 236 associated with a primary video display 234. The touch screen 235 and touch screen processor 236 may be operable to communicate with a video controller 230 of the primary video display 234 and a CPU 210. Thus, a player may be enabled to indicate decisions or choices by touching the touch screen 235 in the appropriate places.

The primary video display 234 may operate in conjunction with the video controller 230 in the CPU 210 to produce multiple separate images on the gaming device 200. Each of these separate images may originate from a separate and independent video signal. This allows a single primary video display 234 to display a plurality of separately and independently acquired images.

Figure 3:
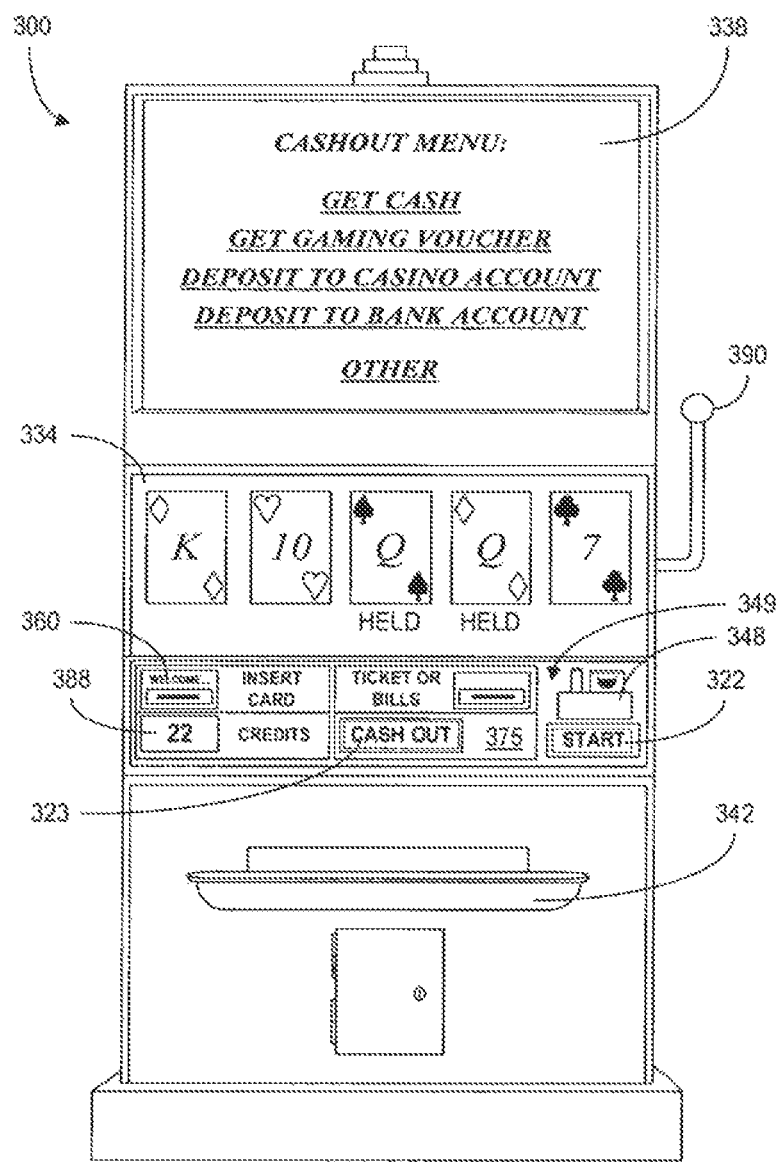
FIG. 3 is an exemplary orthographic view of the gaming device of FIG. 1.

Turning to FIG. 3, an orthographic view of a gaming device 300 is presented, in accordance with one example embodiment. The gaming device 300 may comprise, in one embodiment, for example, gaming device 200 of FIG. 2 and/or a gaming device 102 of FIG. 1. A number of peripheral components are visible on the gaming device 300 and are explained below from the view of a wagering player.

A gaming device 300 may comprise a display area in which a game outcome is displayed to the player. The display area may, for example, be a video display 338 that displays graphical representations of reel symbols or other indicia used to indicate a game outcome. The display area may, in another example, be glass behind which are located mechanical reels. In one embodiment, the display area may be used to display a menu of options available to a player. For example, a "cash-out" menu may be displayed, which menu may indicate to a player an incentive associated with one or more possible forms of payment in which a player may cash out a credit meter balance (regardless of whether the gaming device is limited to one credit meter or a plurality of credit meters). Such a menu may be output, for example, continuously or selectively (e.g., upon a player actuating a cash out button of gaming device 300).

A player desiring to wager on gaming device 300 may first present a player-tracking card to the player-tracking device 360 associated with gaming device 300 to accrue player loyalty points. Typically, a player is provided with a player-tracking card which contains a unique player identifier that is read by the gaming device. The player's wagering activity is reported by the gaming device to a central server where it is recorded in a database. The server maintains a running total of the player's loyalty points as they are accrued through the player's wagering activity.

The player then establishes a credit balance on the credit meter 388. In this embodiment shown in FIG. 3, only one credit meter is needed to accept and output a plurality of monetary forms either by the players selection in one embodiment or automatically as determined by the gaming device in another embodiment. The credit meter balance reflects the amount of electronic credits currently available to a player. The electronic credits from the credit meter may be used by a player to make a wager on a game. The gaming device 300 typically has two wager acceptors—a coin acceptor 348 and a bill/ticket acceptor 349 with which to establish a credit balance on a credit meter.

The electronic credits are typically a fraction of, or represent a basic monetary unit. For example, inserting a one dollar bill into a 25-cent gaming device results in a four credit balance on the credit meter 388. Alternatively, inserting a one dollar bill into a $1 gaming device results in a one credit balance on the credit meter. The electronic credits may be "cashed out" as coins, bills, tokens, a ticket voucher, a cash out strip, and/or transferred to a player's account (e.g., an electronic and/or financial account maintained by a wagering establishment or another entity).

In another embodiment, rather than providing physical currency such as coins, bills, or ticket vouchers, electronic means may be used to establish a credit balance on the credit meter 388. For example, a player tracking card may identify a player and an account the player has with the casino. This casino account may be funded by the player, and as needed, downloaded to the gaming device to establish a credit balance on the credit meter 388.

Alternatively, a smartcard with a monetary balance encoded on an electronic chip (memory) may be read by the gaming device, transferring the monetary balance on the smart card to the gaming device. The smart card may be purchased from the casino in various denominations and used as though it were cash in the gaming establishment.

It is also possible to download monetary value from a player's account at a financial institution. The withdrawal is made from the player's account at the financial institution to a server at the gaming establishment, and the balance subsequently downloaded to the gaming device which displays the equivalent electronic credits on the credit meter 388. In one embodiment, a player tracking card may be used to access this feature. The player tracking card identifies the player with the player's identifier encoded on the player tracking card. The player identifier in turn accesses a database to determine transactional information needed to access the players account at the financial institution. This information may include the players account number at the financial institution, bank routing number, and other data to establish a credit balance on the gaming device.

Once a wager has been placed, the player can start the gaming device 300 with the pull handle 390, or the start pushbutton 322 on the pushbutton panel 375. The game outcome is shown on the primary video display 334.

A secondary video display is also available to present additional player or game information. To increase the display capability of the gaming device 300 even further, video display 334 and/or 338 may be configured to provide a plurality of separately and independently obtained video images on a single video display. Pictures may overlap or be displayed separately. Some images may be ghosted or semi-transparent and overlap. Overlapped images may form a single image.

Traditionally, a player was able to receive a cash out from the gaming device in the form of coins dispensed from a hopper into a coin tray 342. The player pushed a cash out pushbutton 323, the coins were dispensed into the coin tray, and the credit balance meter 383 was reduced to zero. In some embodiments, gaming devices are able to offer other alternative monetary forms in which to receive a cash out. For example, a player may receive a cash out in the form of a ticket voucher from the ticket printer.

With a basic understanding of the gaming device and the gaming network in which it may operate in one embodiment, the methods for offering players incentives to (i) establish one or more credit meter balances; and/or (ii) select particular monetary forms in which to receive a cash out is explained and described in detail in the following sections.

Establishing Balances

Figure 4:
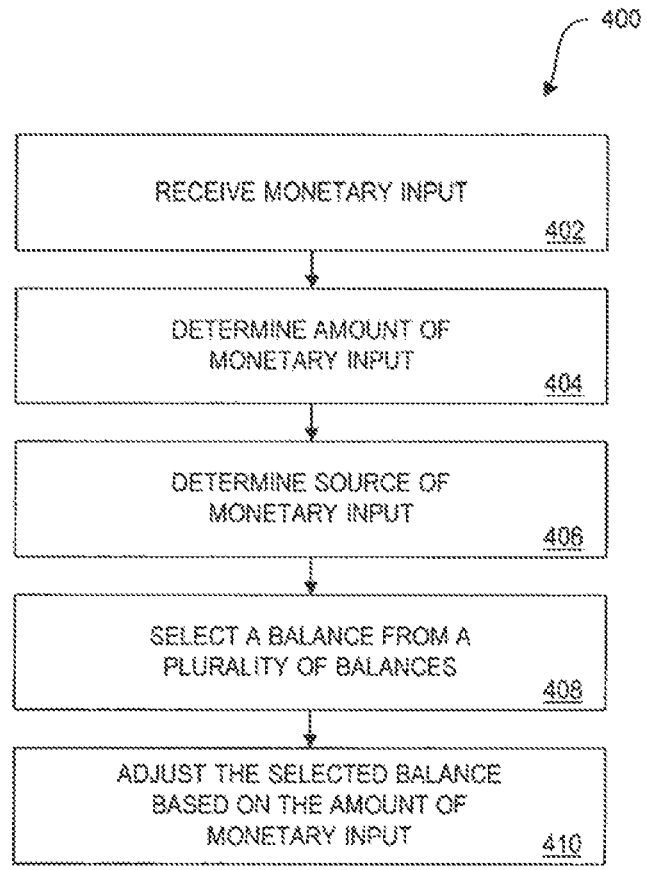
FIG. 4 is an exemplary flow chart illustrating a process for establishing balances.

Referring to FIG. 4, a process 400 for establishing balances initiates when a gaming device receives monetary input (step 402). For example, a player may (i) insert currency into the gaming device, or (ii) insert a credit card or a player tracking card that identifies a casino account and indicates an amount to transfer to the gaming device. The gaming device determines the amount of monetary input that was received (step 404), in a manner known to those skilled in the art. The gaming device also determines the source of the received monetary input (step 406). For example, the gaming device can detect whether currency was inserted into the currency acceptor 349 (FIG. 3), or whether a player tracking card was inserted into the player tracking reader 360 (FIG. 3). Two possible sources of the monetary input are (i) an account stored on the casino server (a "casino account"), and (ii) the player (for currency, credit cards, debit cards and smart cards). Many other types of sources may be defined, and these other sources may be detected by the gaming device.

The gaming device then selects one or more balances from a plurality of balances (step 408). In one embodiment, the gaming device may select the balance based on the source of the monetary input. For example, there may be three balances, each corresponding to one of three possible sources of monetary input.

In another embodiment, the gaming device selects the balance based on the amount of the monetary input. For example, there may be two balances, each corresponding to a different range of amounts. One balance may correspond to amounts greater than a predetermined threshold, and the second balance may correspond to amounts less than or equal to a predetermined threshold. For example, the threshold for a three-coin slot machine may be five coins.

Each balance may have, in one embodiment, an associated payout schedule, an associated probability schedule, or both. Accordingly, there can be different incentives associated with each balance. The gaming device may include balances and associated incentives to, for example, promote the use of a casino account rather than currency, or to promote establishing a large balance. In other embodiments, each balance may have a different schedule of "player-reward points," thereby providing different incentives for using various balances.

In still another embodiment, the gaming device may have only one balance from which to make a wager. This balance may be associated with a monetary form, selected by the player (or the gaming device), in which the player is willing (or wants, commits or agrees) to receive a cash out. This choice may be influenced, as described above, by associating the balance (typically shown on the gaming device's credit meter) with a benefit (bonus) or expense (penalty). For example, in some embodiments, the gaming device may have a single credit meter, and the function of that credit meter with respect to the monetary form it dispenses may be selectively determined—either when the monetary input is established or at the time of cash out. The monetary form selected may have an associated incentive (e.g., a benefit or expense) that is used to adjust the cash out value.

For example, in one embodiment, credits from a monetary input may be cashed out in a pre-determined monetary form (should there be any credits remaining in the credit meter upon a player ending a gaming session) as determined by the player. If the selected monetary form for cash outs is associated with a benefit, the benefit may be added to the monetary input and displayed on the credit meter.

For example, a player may receive an incentive for agreeing to receive a cash out in a particular monetary form (e.g., transferred to the player's account at the gaming establishment or to another financial account). Any benefit/bonus resulting from the monetary input and the particular selection of a monetary form to receive a cash out, in one embodiment, may also be added to the credit meter balance.

It should be understood that the gaming device may have only one credit meter and one balance on the credit meter. Consequently, the monetary form in which the player receives any cash out may be electronically selected by the player (e.g., from a touch screen display menu). In one embodiment, the touch screen display cash out menu may include the benefits or expense associated with each of the different monetary forms available.

In another embodiment, it may be also required that the credits, or equivalent value, must be received and disbursed via the same monetary form. For example, in one embodiment, a gaming device may automatically retrieve funds from a player's casino account to establish a credit balance on the credit meter and automatically cash out of that credit meter back into the player's casino account. In such an embodiment, the player may be provided with an incentive for allowing a system to so automatically transfer credits to and from the player's casino account. In another embodiment, any monetary source may be used to establish a credit balance on the credit meter and still receive the benefit associated with a monetary form selected for cash out. In at least some embodiments, the gaming device may automatically select the appropriate balance on the gaming device based on the input source.

Each monetary form has a different cost structure and expense associated with a cash out transaction. Accordingly, it is in the interest of the gaming establishment to promote the use of a monetary form that minimizes transactional expenses. A system can be established with the appropriate bonuses and fees to provide an incentive for the player to select the most cost-efficient monetary form. With the appropriate incentives, this method may promote particular monetary forms among players and provide substantial cost savings to the gaming establishment.

For example, after a monetary input is made and a cash out monetary form selected, the gaming device adjusts the balance based on the amount of the monetary input. Typically, the gaming device increases the selected balance by the amount of the monetary input. Alternatively, the gaming device may increase the selected balance by a predetermined percentage of the amount of the monetary input. For example, if $100.00 of monetary input is received, the gaming device may apply 105% of the $100.00 to the selected balance, thereby increasing the selected balance by $105.00.

In those embodiments that provide a bonus/benefit in the form of credits in response to accepting a cash out in a specific monetary form, certain safeguards may be desirable to prevent a player from establishing a balance and immediately cashing out without wagering on the gaming device. One example safeguard may be a requirement that the monetary input received from the player must be wagered before the benefit/bonus is made available. For example, if a player establishes an initial credit balance with a monetary input of $10, 10 one-dollar wagers must be made (or the equivalent) before the bonus associated with the credit balance is provided to the player. Accordingly, if the bonus is 10% of the initial monetary input, after the player has placed 10 one-dollar wagers, an additional one dollar is added to the credit balance. This embodiment requires only one credit meter. If the player cashes out before 10 one-dollar wagers are made, the one dollar bonus is not added to the credit meter in this embodiment.

Figure 18:
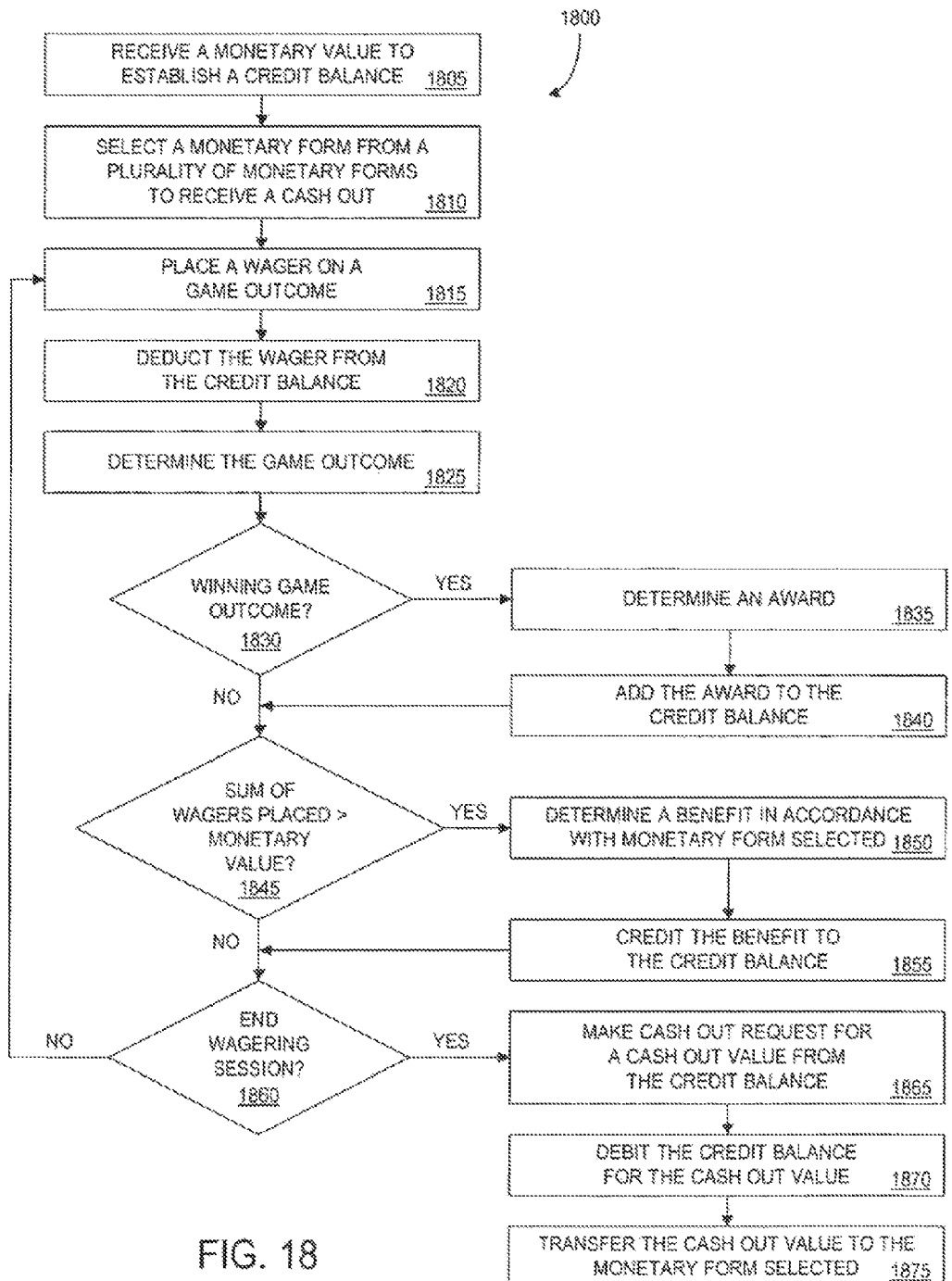
FIG. 18 is a flow chart illustrating a fifth embodiment of a process for dispensing monetary output.

This process with the above described safeguard, in one embodiment, is depicted in the flow process diagram of FIG. 18. Turning to FIG. 18, a monetary value is recognized by the gaming device to establish a credit balance in step 1805. The player selects a monetary form from a plurality of monetary forms in which to receive a cash out in step 1810. At least one of the monetary forms has an associated incentive to be provided to the player when that monetary form is selected for cash outs. A wager is placed on a game outcome in step 1815. The wager is deducted from the credit balance in step 1820. A game outcome is determined in step 1825. In step 1830, a determination is made whether the game outcome is a winning or losing game outcome. A winning game outcome causes an award to be determined in step 1835. The determined award is added to the credit balance in step 1840. The next step, for either a winning or losing game outcome as determined in step 1830, is to determine whether the sum of the place wagers is greater than or equal to the monetary value in step 1845. If the sum of the placed wagers is greater than or equal to the monetary value, a benefit (i.e., bonus) is determined in step 1850 in accordance with that monetary form selected. The determined benefit is added to the credit balance in step 1855. The next step, regardless of the sum of placed wagers determined in step 1845, is to determine whether to end the wagering session in step 1860. If the wagering session is not ended, another wager is placed in step 1815. If the waiting session is to end, a cash out request for a cash out value is made in step 1865. The credit balance is debited the cash out value in step 1870. The cash out value is transferred in the monetary form selected in step 1875.

A further description of the step of selecting a balance is described below.

Figure 5:
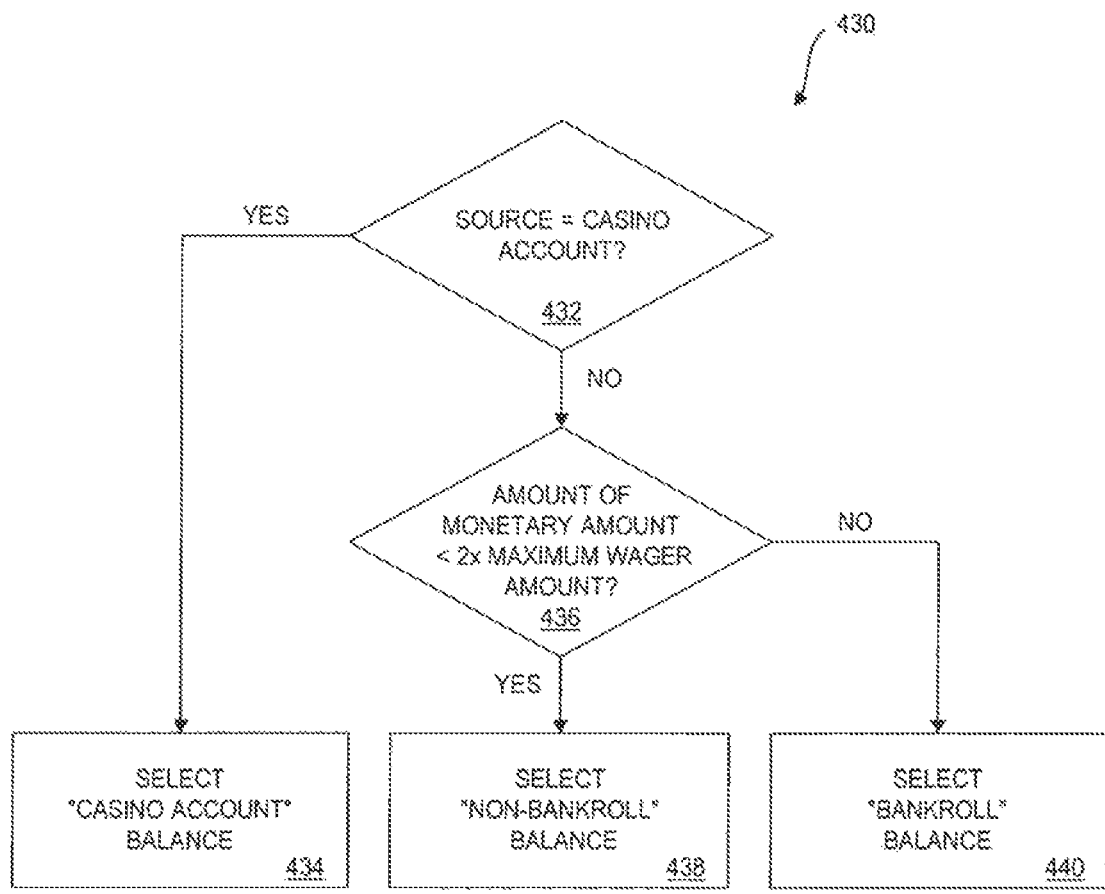
FIG. 5 is an exemplary flow illustrating an exemplary process for selecting a balance.

Referring to FIG. 5, an exemplary process 430 for selecting a balance (as indicated by the step 408 of FIG. 4) begins with a determination of the source of the monetary input (step 432). If the source is a casino account, then a "casino account" balance is selected (step 434). Otherwise, the gaming device determines the amount of monetary input (step 436). For example, if the amount is less than a predetermined threshold of twice the maximum wager of the gaming device, then a "non-bankroll" balance is selected (step 438). If the amount is not less than twice the maximum wager of the gaming device, then a "bankroll" balance is selected (step 440). Of course, the names attributed to balances may be varied as desired.

In the exemplary process 430, there are three balances ("casino account" balance, "non-bankroll" balance, and "bankroll" balance). Those skilled in the art will realize that any number of balances may be provided in various embodiments. The particular criteria for selecting a balance may be designed to further any number of goals. For example, whether monetary input increases the "non-bankroll" balance or the "bankroll" balance depends on whether the amount exceeds a threshold. In the example of FIG. 5, such a threshold was twice the maximum wager of the gaming device. Such a threshold is established in order to discriminate between players that provide only enough payment for one play, or sufficient payment for more than one play.

A plurality of balances may be increased in the manner described above. For example, a player may first provide the gaming device with funds from a casino account, thereby increasing the "casino account" balance. Thereafter, the player may insert currency into the machine, increasing the "non-bankroll" balance or the "bankroll" balance, depending on the amount of currency inserted.

Selecting a Wager Amount

Once one or more balances are established, the player selects a wager amount and initiates a play of the gaming device. Since there is more than one balance, the gaming device must determine a "wagering balance" from which the wager amount is drawn.

Figure 6:
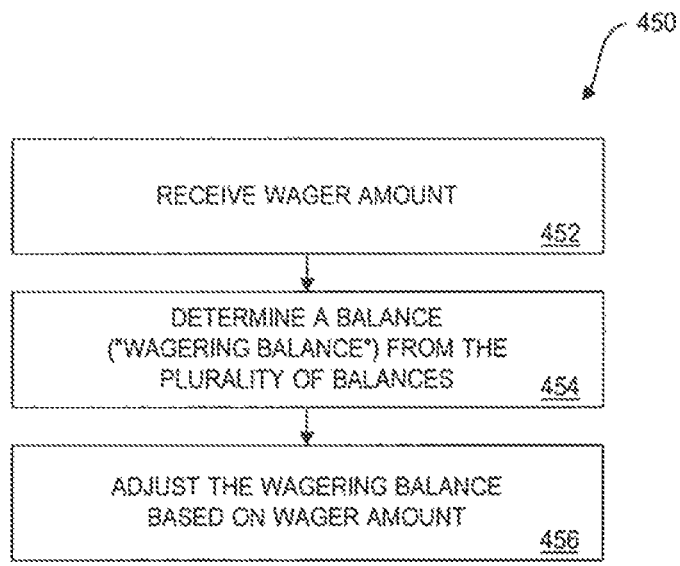
FIG. 6 is an exemplary flow chart illustrating a process for selecting a wager amount.

Referring to FIG. 6, a process 450 for selecting a wager amount begins when the gaming device receives a wager amount from the player (step 452). As is known in the art, the player may actuate one or more pushbuttons of the pushbutton panel 375 (FIG. 3) to indicate the wager amount. For example, many video poker machines have a "Bet Max" pushbutton, indicating the maximum wager amount for the machine. Other methods of indicating the wager amount will be understood by those skilled in the art.

A balance from the plurality of balances is determined (step 454). For example, the player may select the balance using the pushbutton panel 375 (FIG. 3), which in turn generates a signal that represents the selected balance. Alternatively, the balance may be determined based on the wager amount. For example, if the wager amount is less than a predetermined threshold, a first balance is used. Otherwise, a second balance is used. In such an embodiment, it is desirable to provide an advantage to using the second balance, since players would then have an incentive to select wager amounts greater than the predetermined threshold. Large wager amounts are typically preferred by casinos. For example, it can be advantageous to provide an incentive for a player to wager the maximum amount allowed for the gaming device.

In another embodiment, the balance may be determined based on one or more predetermined rules. For example, one rule may specify that any balance greater than or equal to the wager amount is the determined balance. Another rule may specify that the greatest balance is the determined balance. Many such rules will be understood by those skilled in the art. The rules may be retrieved from the data storage device 224 (FIG. 2), and/or may be selected by the player upon actuation of the pushbuttons of the pushbutton panel 375 (FIG. 3).

More than one balance may be determined. For example, the wager amount may be greater than any one balance; consequently, a draw may be made from a set of two or more balances. Each such balance may be determined as described above.

Once a balance is determined, that balance, deemed the wagering balance, is adjusted based on the wager amount (step 456). Typically, the wagering balance is decreased by the wager amount. However, in certain embodiments the wagering balance may be decreased by a predetermined percentage of the wager amount. For example, if a $5.00 wager amount is received, the gaming device may apply 95% of the $5.00 to the wagering balance, thereby decreasing the wagering balance by $4.75. Such an embodiment may provide an incentive for using a particular balance as the "wagering balance."

In other embodiments, a set of wagering balances is adjusted by the wager amount. Each wagering balance is adjusted by a portion of the wager amount. The set of wagering balances may also be adjusted based on the wager amount and one or more predetermined rules. Such rules may, for example, specify the portions of the wager amount, and each wagering balance that is decreased thereby.

Determining an Award Amount

Figure 7:
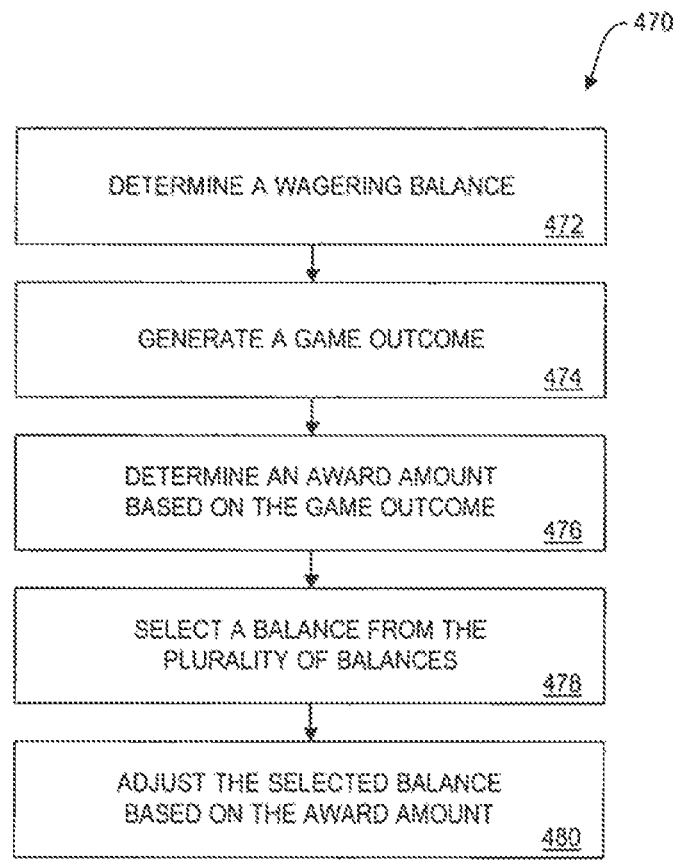
FIG. 7 is an exemplary flow chart illustrating a process for determining an award amount.

Referring to FIG. 7, a process 470 for determining an award amount includes a step 472 of determining a wagering balance from the plurality of balances. The step 472 has been described above in conjunction with FIG. 6. The gaming device next generates a game outcome (step 474), typically by generating a random number, and in turn accessing a probability schedule to determine a game outcome corresponding to the random number. An award amount based on the game outcome is then determined (step 476). One method of determining the award amount is to access a payout schedule to determine an award amount corresponding to the game outcome. A balance is selected from the plurality of balances (step 478), and that balance is adjusted based on the award amount (step 480).

Referring to FIG. 8, an exemplary probability schedule 500 defines a set of outcomes 502 and corresponding likelihoods of the outcomes. The probability schedule 500 includes entries 508-542, each defining an outcome and its corresponding probability of occurrence. The probability of occurrence of each outcome is defined by a range 504 of random numbers, and/or a number of expected hits per cycle 506.

The exemplary probability schedule 500 includes a number of slot machine-type outcomes. As is known in the art, in a typical slot machine having three reels, each reel may assume one of twenty-two positions. Accordingly, there are 10,648 reel combinations (22×22×22=10,648). For a more detailed discussion of slot machines, associated probabilities and payouts, reference may be made to J. Regan, Winning at Slot Machines (Citadel Press 1985), incorporated by reference herein.

To generate an outcome, the gaming device generates a random number from "1" to "10,648". The generated random number corresponds to one entry, and therefore to one outcome. The number of expected hits per cycle 506 defines the average number of times each outcome will be generated for a cycle of 10,648 plays. Accordingly, a greater number of expected hits per cycle indicates a more likely outcome.

Referring to FIG. 9, an exemplary payout schedule 550 defines a set of outcomes 552 and corresponding award amounts 554. The payout schedule includes entries 555-588, each defining an outcome and its corresponding award amount. For example, the entry 556 indicates that an outcome "CHERRY/ANY/ANY" corresponds to an award amount of "2."

Given a probability schedule and a payout schedule, an award may be determined for a play. For example, referring again to FIGS. 8 and 9, if the gaming device generates a random number "10,358" during a play, this random number corresponds to the entry 518 of the probability schedule 500 (FIG. 8). The entry 518 defines the outcome "CHERRY/ANY/CHERRY." Similarly, the entry 564 of the payout schedule 550 also defines the outcome "CHERRY/ANY/CHERRY." The entry 564 corresponds to an award amount "5", and thus for this play the award amount is five (coins or other units of monetary input).

In another embodiment, each balance may have an associated probability schedule, and the gaming device may generate the game outcome based on the probability schedule of the wagering balance. Accordingly, the player would have different incentives to draw from different wagering balances.

Referring to FIG. 10, an embodiment of a probability schedule 600 defines a set of outcomes 602 and corresponding likelihoods of the outcomes for each of three balances. The probability schedule 600 includes entries 608-642, each defining (i) an outcome, (ii) a probability of occurrence for wager amounts drawn from a "non-bankroll" balance, (iii) a probability of occurrence for wager amounts drawn from a "bankroll" balance, and (iv) a probability of occurrence for wager amounts drawn from a "casino account" balance.

The probability of occurrence for wager amounts drawn from the "non-bankroll" balance is defined by a range 645 of random numbers, and/or a number of expected hits per cycle 650. The probability of occurrence for wager amounts drawn from the "bankroll" balance is defined by a range 655 of random numbers, and/or a number of expected hits per cycle 660. The probability of occurrence for wager amounts drawn from a "casino account" balance is defined by a range 665 of random numbers, and/or a number of expected hits per cycle 670.

As illustrated by the exemplary information of FIG. 10, for any particular outcome, the probability of occurrence may be different for different balances. For example, the entry 626 that defines an outcome "ORANGE/ORANGE/ORANGE," has for each balance a different number of expected hits per cycle. The number of expected hits per cycle for the "non-bankroll" balance is "42," the number of expected hits per cycle for the "bankroll" balance is "44", and the number of expected hits per cycle for the "casino account" balance is "48." Accordingly, the outcome "ORANGE/ORANGE/ORANGE" is more likely to occur when the wager amount is drawn from the "casino account" balance than from the "non-bankroll" balance or the "bankroll" balance.

In addition, if the gaming device generates a random number "10,607", that random number would correspond to (i) the entry 636 (game outcome "BELL/BELL/BAR") if the wager amount is drawn from the "non-bankroll" balance, (ii) the entry 638 (game outcome "BELL/BELL/BELL") if the wager amount is drawn from the "bankroll" balance, and (iii) the entry 638 (game outcome "BELL/BELL/BELL") if the wager amount is drawn from the "casino account" balance. After generating such a game outcome, the gaming device may next determine an award amount from a payout schedule, such as the payout schedule 550 (FIG. 9).

Referring to FIG. 11, an embodiment of a payout schedule 700 defines a set of outcomes 702 and corresponding award amounts for each of three balances. The payout schedule 700 includes entries 708-742, each defining (i) an outcome, (ii) an award amount 744 for wager amounts drawn from a "non-bankroll" balance, (iii) an award amount 746 for wager amounts drawn from a "bankroll" balance, and (iv) an award amount 748 for wager amounts drawn from a "casino account" balance. For example, the entry 742 indicates that an outcome "7/7/7" corresponds to an award amount of "100" for wager amounts drawn from a "non-bankroll" balance, an award amount of "120" for wager amounts drawn from a "bankroll" balance, and an award amount of "130" for wager amounts drawn from a "casino account" balance. In this manner, players are provided an incentive to create, and in turn draw wager amounts from the "casino account" balance.

As described above with reference to FIG. 7, once an award amount is determined, a balance is selected from the plurality of balances, and that balance is adjusted based on the award amount. Typically, the selected balance is increased by the award amount. In another embodiment, the selected balance is increased by a predetermined percentage of the award amount.

In one embodiment, the selected balance is the wagering balance. In another embodiment, the selected balance is a predetermined balance that is increased by all award amounts the player wins. For example, there may be a "payout" balance that is increased by all award amounts won by the player. It can be advantageous to provide an incentive to draw wager amounts from such a "payout" balance, since many players view "won" money as less valuable than "their own" money and therefore are less conservative when wagering with it.

In another embodiment, the balance may be selected based on one or more predetermined rules. For example, one rule may specify that any balance below a predetermined threshold is the selected balance. Another rule may specify that the greatest balance is the selected balance. Still another rule may specify that the balance providing the greatest advantage (i.e., the most incentive) to the player is the selected balance. Many such rules will be understood by those skilled in the art. The rules may be retrieved from the data storage device 224 (FIG. 2), and/or may be selected by the player upon actuation of the pushbuttons of the pushbutton panel 375 (FIG. 3).

In one embodiment, the award amount may be determined by generating a supplemental (second) game outcome if the (first) game outcome corresponds to a non-winning outcome. The award amount would then be determined, as described above, based on the supplemental game outcome. In such an embodiment, the player may be prompted to "spin again," or otherwise initiate a second play, for free.

In one embodiment that encourages the use of under-utilized gaming devices, as well as the use of accumulated winnings for subsequent play, the "payout" balance may be transferred to another gaming device across the network. Thus, when the "payout" balance is transferred to a predetermined (under-utilized) gaming device, and a wager amount is drawn from the "payout" balance, the "payout" balance would be decreased by a fraction of the wager amount. For example, if a "payout" balance is transferred to a predetermined gaming device, and a wager amount of $5 is drawn from this balance, the balance may be decreased by only $4.75. Such a decrease represents a "bonus" of 5% ($5−$4.75=$0.25=5% of $5). Other incentives may be provided for using the "payout" balance.

Similarly, this bonus may be increased as time passes, thereby providing an incentive to return to the casino. Alternatively, the bonus may be decreased as time passes, thereby providing an incentive to return promptly to the casino. Further, the bonus may decrease to zero after a predetermined time period elapses.

Dispensing Monetary Output

Figure 12:
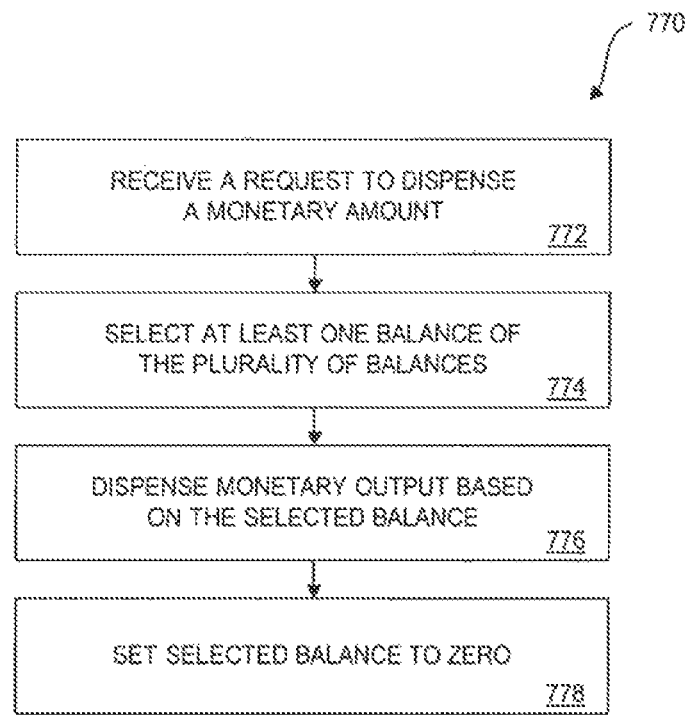
FIG. 12 is a flow chart illustrating a first embodiment of a process for dispensing monetary output.

Referring to FIG. 12, a process 770 initiates when the gaming device receives a request to dispense monetary output (step 772). At least one balance is selected (step 774), and a monetary amount based on the selected balance(s) is dispensed (step 776). Each selected balance is in turn set to zero (step 778).

The player may select the balance using the pushbutton panel 375 (FIG. 3), which in turn generates a signal that represents the selected balance. Alternatively, the balance may be determined based on at least one predetermined rule. Rules and their application have been described above. For example, a rule may specify that all balances that are greater than zero are selected.

As also described above, dispensing typically includes activating a hopper in the gaming device to dispense an amount of currency to the player. Some gaming devices alternatively credit an account with the monetary amount based on the selected balance(s). Such an account may be identified by a signal received from player tracking card reader 360 (FIG. 3) of the gaming device. The account may be, for example, a credit card account or casino account stored on a casino server.

Figure 13:
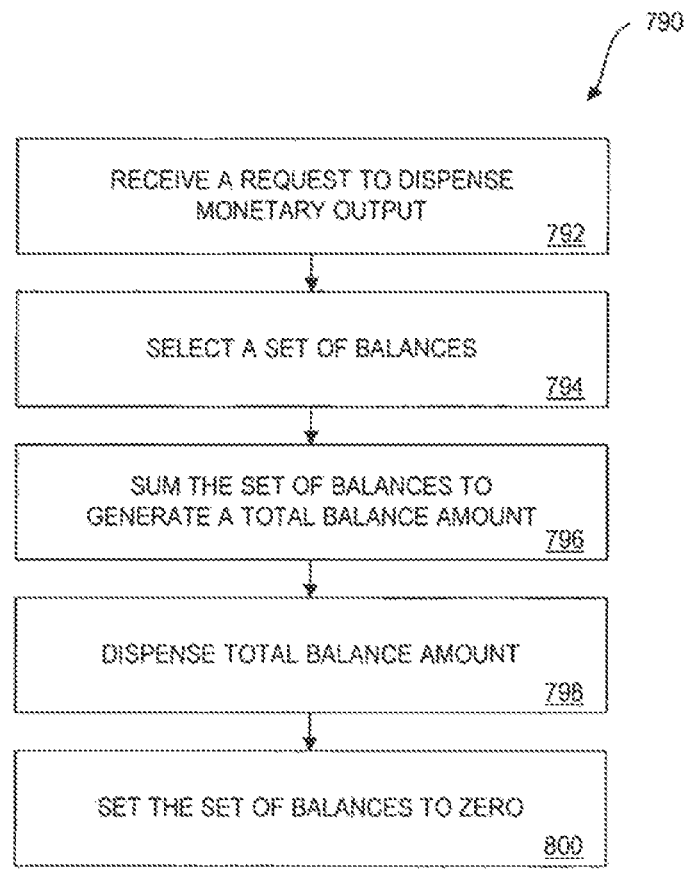
FIG. 13 is a flow chart illustrating a second embodiment of a process for dispensing monetary output.

Referring to FIG. 13, in another embodiment a set of two or more balances is selected, and the corresponding amount dispensed. A process 790 initiates when the gaming device receives a request to dispense monetary output (step 792). Next, a set of balances are selected (step 794), and the selected balances are summed to generate a total balance amount (step 796). Finally, the total balance amount is dispensed (step 798) and each selected balance is set to zero (step 800).

Alternatively, the total balance amount may be generated by summing the set of balances and a bonus value. Such a bonus value may be based on a balance. For example, if two balances have values of "$15" and "$40", and the bonus value is 50% of the second balance, then the total balance is $75 ($75=$15+$40+50% of $40).

In an alternate or supplemental embodiment, additional types of balances can be defined. For example, a "marker" balance can be defined as funds obtained by the player from the casino by signing a promissory note or other credit instrument, or otherwise "borrowed" by the player from the casino. Typically, such a marker balance allows a player to play at times when the player does not have any currency or account balance available. If a player ends up with a "net win" (cumulative award amounts exceed borrowed funds), the borrowed funds are deducted from the award amounts, and a signal can be sent to casino personnel to destroy the credit instrument. The use of marker credits can be rewarded much like the other types of balances described above.

Incentives for Selected Cash Out Forms

There exists a plethora of different monetary forms in which a player may select to receive a cash out. Certain monetary cash out forms are advantageous to the gaming establishment. These forms may promote further wagering activity and/or have lower associated overhead expenses. For example, electronic funds transfer (EFT) may be preferred to ticket printing and or coinage which have mechanical components susceptible to cyclic degradation necessitating preventive or corrective maintenance.

As noted above, a player finishes wagering at a gaming device cashes out of the gaming device to collect any remaining funds on the credit meter. Because players have a variety of different needs and preferences, providing only a single cash out method (such as coins) is undesirable. Players may want a variety of cash out options to satisfy a wide variety of differing needs.

For example, in addition to coins, most gaming devices have the capability of providing a ticket voucher in lieu of coins. An electronic casino player account may also be available that is associated with a unique player identifier (e.g., a player tracking identifier). The player may electronically withdraw funds from the player's casino account to establish a balance on the gaming device's credit meter. For example, a player tracking card or smart card may identify the player to the gaming device. The gaming device provides the player identity to a server, enabling the player to establish a balance on the credit meter. A player may deposit a balance on the credit meter back into the player's casino account.

Alternatively, gaming device may credit a player's account at a financial institution. The financial account may be, for example, a credit card account, a debit account, a charge account, a checking account. In such an embodiment the gaming device may communicate with a server and in turn communicate with a financial institution's server on which the account is maintained.

In one embodiment, all of the available types of specific monetary cash out forms may be presented to the player on the video display when the player requests a cash out. The video display may offer the player the option to: "Dispense credit balance in cash"; "Dispense credit balance on a cashless ticket voucher"; "Transfer credit balance to my player account"; and "Transfer my credit balance to my financial institution." The video display may have an associated touch screen panel that allows the player to touch the video display to select the monetary form desired for the cash out. In addition to these four different choices, additional cash out forms are potentially available in other embodiments. These embodiments include various types of financial institution accounts such as debit accounts, credit card accounts, etc.

Specific cash out forms available to a player from the gaming device may vary depending upon various parameters. For example, if the player does not have a player tracking card, or otherwise a player identifier, the gaming establishment may not be able to allow the player to deposit the credit balance to a player account (although provision could be made to allow a player to immediately register with the casino to establish such a player account). Likewise, if the player does not have an account with a financial institution, this cash out form will not be an available option for the player. Further, coins may not be available as an option if the gaming device has an inadequate supply of coins.

More subtle rules may apply to the available cash out forms depending upon the credit balance on the gaming device. For example, if the player has a minimal credit balance, wiring funds to a financial institution is probably cost prohibitive in most cases—and may not be allowed. Alternatively, in the event that the player has won a jackpot, the player may be dissuaded from taking a cash out in cash; as directly wiring funds to a financial institution provides superior security to the player.

Providing Incentives for Specific Forms of Monetary Output

In some embodiments it is advantageous to provide incentives to influence the player to select certain monetary forms in which to receive a cash out. For example, as discussed above, cash outs may be received in the form of currency (e.g., coin), cashless ticket vouchers, deposited to a player account (within the gaming establishment), or deposited to a bank account. The expenses to the gaming establishment associated with these various cash out forms varies significantly.

Strictly from the perspective of overhead costs, receiving a cash out in the form of coin may be a relatively expensive proposition. For example, the gaming device experiences hopper degradation from mechanical cycling which requires maintenance. Labor is required to fill the coin hopper and track coin inventory. Even ticket vouchers have associated expenses including ticket paper, the cost and maintenance of the ticket printer, and in some cases, the storage of redeemed ticket vouchers.

The gaming establishment's interest in facilitating further game play may also favor certain monetary forms for cash outs. Cash provides little incentive to promote further game play. Consequently, cash outs in the form of cash might be dissuaded in favor of other cash out forms. For example, a ticket voucher can generally only be used in the gaming establishment that printed the ticket. Similarly, a player account with the gaming establishment provides incentive to return to the gaming establishment to use (or receive) the balance in the player's casino account.

Accordingly, further game play is most likely to occur with a cash out in the form of a ticket voucher or with a deposit directly to a player account than with other cash out forms, such as payouts in currency. Direct deposit to a player account may be preferable to a ticket voucher as the overhead costs associated with a deposit directly to the player account is less than that associated with ticket vouchers (direct deposit to the player's casino account may be an entirely electronic transaction, eliminating the expense of the ticket voucher).

Incentives or disincentives may also be provided on the basis of the security value provided by specific cash out forms. From the perspective of the player, ticket vouchers are generally less secure as they can be lost or stolen (although some ticket vouchers may provide a security code identifying the player and further requiring confirmation of the player's identity before accepting a cash out request), the tickets themselves can be mutilated and hence unreadable by the gaming device, and the gaming vouchers require additional effort to store and retrieve (for both the player and the gaming establishment).

Consequently, it might be preferable from a security standpoint to receive a cash out in the form of a direct deposit to the player's casino account. Alternatively, to ensure security, the gaming establishment could offer to transfer funds electronically to a player's financial institution for deposit. Although transfer to a player's financial institution is a less desirable transaction from the gaming establishment's point of view (with respect to promoting additional wagering activity), it provides the player with a valuable security service. Such a transfer may require a fee because of the complexity involved with such a transaction and because of the fees typically charged by a financial institution for such services. For example, in the event a player has a large credit balance to be cashed out, the gaming establishment could automatically deposit funds directly to a player's account in a financial institution—both as a service to the player and as a means to reduce the transactional costs associated with this type of payout.

The least attractive transaction from the viewpoint of the gaming establishment is a hand pay. This process may entail, in some circumstances, receiving a ticket voucher which is taken by the player to a cashier cage for redemption. The player is required to wait in line for a cashier, provide the ticket voucher to the cashier, and wait for the cashier to process the ticket voucher to receive a cash out. Because this is a labor-intensive process, and a less secure method for redeeming a credit balance, the gaming establishment may want to discourage this form of cash out. Preferably, a credit balance would be cashed out directly to a casino player account. Less preferably, a credit balance could be cashed out in the form of a ticket voucher. Least preferably, in most instances, a small credit balance is paid out directly in coin.

Consequently, it can be seen that it is advantageous to promote specific cash out forms for both the gaming establishment and the player. These incentives (or disincentives) can either be in the form of benefits/bonuses or expenses/penalties associated with particular monetary forms used to cash out of the gaming device.

Types of Incentives

To influence players to select a particular cash out form, at least one (or a series) of bonuses and/or fees may be associated with the selection of one or more of the cash out options. Accordingly, in one embodiment, the gaming establishment's preferred cash out form may be promoted with an appropriate benefit/bonus. For example, when cashing out a credit balance it would be advantageous to the gaming establishment for the player to transfer the credit balance directly to the casino player account. Such a choice by the player to select this cash out form may be accompanied with a monetary or non-monetary bonus. Non-monetary bonuses may include free or discounted games (e.g., entries into a lottery), player loyalty points, discounted goods and services, receiving a larger payback parentage (better pay table or probability table) on games played, etc.

For example, the player may receive a percentage of the credit balance transferred as a bonus. For example if the player has a 100-credit balance, a 5% bonus may be paid to the player for selecting a cash out deposited to a player account (i.e., the player receives 105% of the credit balance). Alternatively, for example, the non-monetary bonus may include receiving player loyalty points as a percentage of the transferred credit balance. For example, a player with a 100-credit balance transferred to a player account might receive 100 player loyalty points for this transfer credited to the player's loyalty account.

In lieu of a percentage of the credit balance, in another embodiment, a flat bonus of either money or player loyalty points might be provided to the player for a particular cash out form. For example, flat fees may be assessed each time a cash out is made. For example, a cash out in coin may always require a one dollar fee.

In another embodiment, a fee may be associated with a less than desirable cash out form or with a cash out form incurring considerable transactional expense to accomplish. For example, a direct deposit from the gaming device to a player's account at a financial institution may incur considerable expenses because of the complexity of the transaction and banking fees associated with a direct deposit. Consequently, a gaming establishment, because of these high costs, may charge an appropriate transaction fee for the service.

Additional forms of benefits and expenses may also be available. For example, in lieu of a flat fee, certain cash out forms may include variable fees (or benefits). Variable fees may be associated with credit balances. For example, receiving a $100-credit balance or more in the form of a ticket voucher may cost 5% of the credit balance. Accordingly, the player would receive a ticket voucher worth $95 for a $100-credit balance. To further illustrate this example, a cash out less than $100, is not assessed a fee.

Fees may also be variable based on the time of day. During peak business hours, larger fees may be assessed for cashing out. For example, during peak business hours a 10% variable fee (or alternatively a larger fixed fee) may be charged for cashing out in comparison to a 5% variable fee during off-peak hours.

Variable fees may also be based on the number of times a player has selected a particular cash out form. For example, a player may incur escalating fees for cash outs as they occur more frequently. For example, a player may be charged a one dollar fee for a first cash out in the first 15 minutes of play and a $1.50 fee for a second cash out in the next 15 minutes of play. The intent with this progressive variable fee is to minimize the number of times a player cashes out of the gaming device.

A non-monetary fee/penalty may also be imposed. For example, wagers recorded during a gaming session may receive fewer player loyalty points if a particular cash out form is used. This reduction in player loyalty points may be either a flat adjustment or a percentage adjustment of the player loyalty points that would have otherwise been earned. In another embodiment, the non-monetary penalty may include an adjustment to the wagering game to produce an unfavorable payback percentage (e.g., changing the pay table awards).

Figure 19:
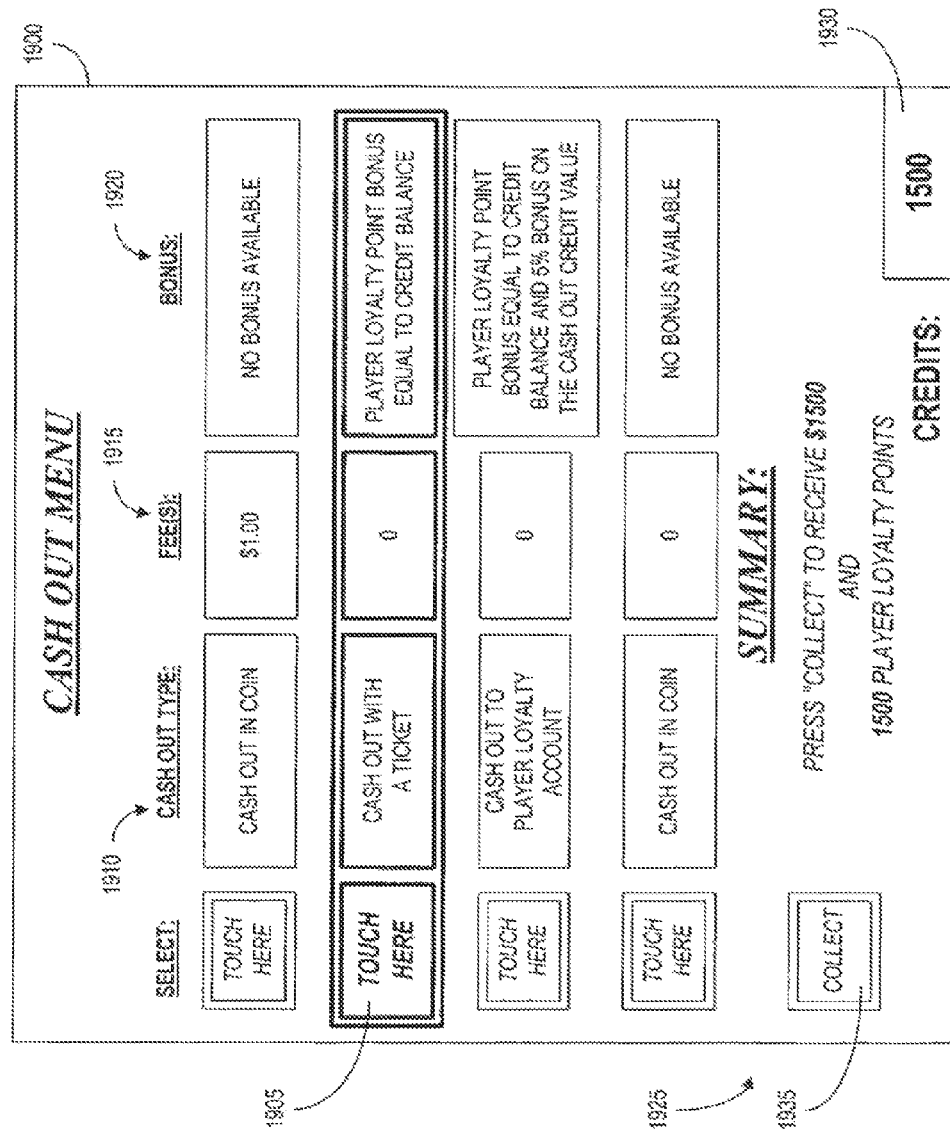
FIG. 19 is an exemplary embodiment of a cash out menu on a video display.

Accordingly, the player would be presented with a menu of cash out options presented in the video display of the gaming device as shown in an exemplary embodiment illustrated in FIG. 19. The cash out menu 1925 is provided on a video display 1900. This menu facilitates the selection of a particular cash out form. The menu may also provide information relating to the bonuses and fees associated with each cash out option.

The cash out menu includes the monetary form of the cash out 1910, the fee 1915, if any, associated with the cash out type, and any bonus 1920 associated with the cash out type. The credit meter 1930 displays the available credits for cash out. A touch screen button 1905 may be used to select one of the monetary forms to select a specific cash out form. The collect button 1935 provides the command to accept the monetary form selected and receive the cash out as provided in the summary.

The cash out menu may be driven by a cash out database as illustrated in FIG. 17. Turning to FIG. 17, a cash out database with exemplary entries is presented in accordance with one example embodiment. The cash out database 1700 may comprise, in one embodiment, for example, the cash out database 144 of FIG. 1.

The cash out database 1700 may have cash out identifier 1705 to locate the record of a particular monetary form in the database. The monetary form 1710 (i.e., cash out type) is identified in the database along with associated fees 1715 (if any) and bonuses 1720 (if any). In addition, conditions 1725 may be presented which determine the availability of the cash out type 1710 are also presented.

For example, using the exemplary cash out database and assuming a credit balance of 100-credits on a one dollar gaming device, each of the different monetary forms will be evaluated for their final cash out value. First, the 100-credit balance on the credit meter of the one dollar gaming device is equivalent to $100 and may be converted to a monetary form having one of four different possible forms. These forms include cash, ticket voucher, a player's casino account, or transferred to a player's bank account.

If the player selects cash (option O-1A), a $1 cash out fee is assessed and the player will receive $99. In an alternative embodiment, the fee may be deducted from the remaining balance on the credit meter, if available. Accordingly a player may receive the full cash out value of $100 if the player has at least a $101 dollar balance on the credit meter.

If the player selects to receive a ticket voucher (option O-2), no fee is assessed and the player receives $100 in the form of a ticket voucher. In addition, a bonus is associated with this monetary form and the player receives 100 player loyalty points (a player loyalty point for each dollar cashed out).

If the player elects to transfer the credit balance to a player account (option O-3), the player receives 105% of the credit balance (encouraging the player to make this selection). Accordingly, the player receives $105 deposited to the player's casino account and 105 player loyalty points.

In some embodiments, monetary bonus payments may not be cashed out directly by the player. Instead, the player may be required to place these bonus amounts at risk through a wager. A winning game outcome allows the player to then cash out the monetary value won.

If the player elects to transfer the credit balance to a financial institution (option O-4B), a $25 handling fee (e.g., for wire charges associated with the transfer) may be assessed. Accordingly, in one embodiment, the 100-dollar cash out request results in only a 75-dollar deposit to the player's financial account, (a player loyalty point for each dollar cashed out). In an alternative embodiment, the cash out value may be the full 100 dollars requested if sufficient funds are available on the credit meter to absorb the fee associated with this transaction.

General Flowchart Process for Incenting Specific Cash Out Forms

The process of providing incentives for specific cash out forms can be described, in at least one embodiment, as the following exemplary process: (i) receiving a request to cash out a credit balance; (ii) providing a first option for cashing out the credit balance, the first option associated with an expense or benefit in a specified first cash out form, and a second option for cashing out the credit balance, the second option not associated with an expense or benefit in a second cash out form; (iii) receiving a selection of the first cash out option; and (iv) providing the credit balance adjusted by the associated expense or benefit. This process, in one embodiment, is depicted in the flow process diagram of FIG. 14.

Figure 14:
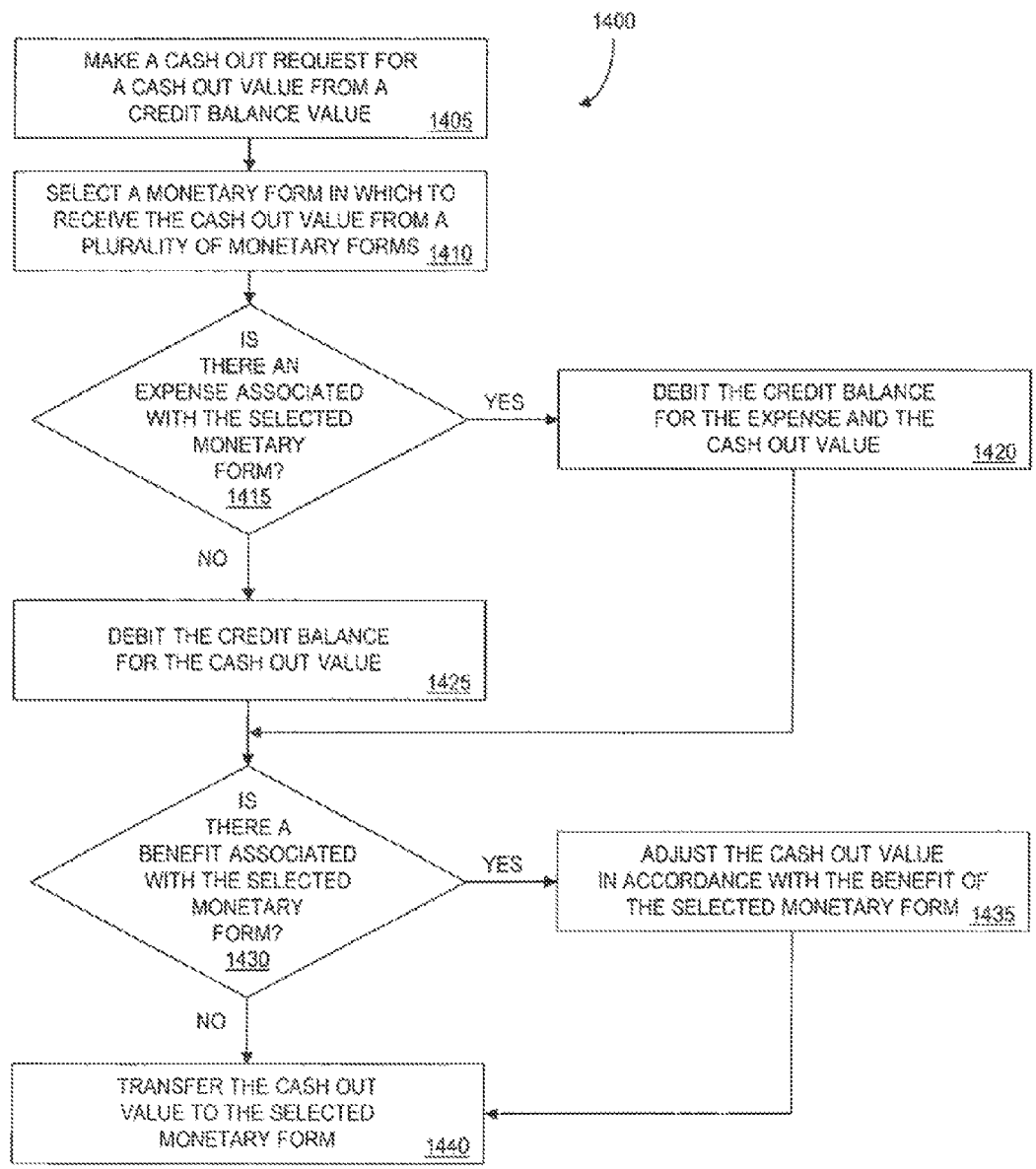
FIG. 14 is a flow chart illustrating a third embodiment of a process for dispensing monetary output.

Turning to FIG. 14, the flow process 1400 begins with a cash out request made by a player for a cash out value from a credit balance on the gaming device in step 1405. The player is then prompted by the gaming device to select the monetary form the player wants in step 1410. In step 1415, the gaming device determines whether an expense is required for the monetary form selected by the player. If an expense is required for the monetary form selected, the credit balance is debited for the sum of the expense and the cash out value requested in step 1420. If no expense is required for the monetary form selected, the credit balance is debited for the cash out value in step 1425.

In either case, once the credit balance has been adjusted, a determination is made whether a benefit/bonus is associated with the monetary form selected in step 1430. If a bonus is associated with the monetary form selected, the cash out value is adjusted for the bonus in step 1435. If there is no benefit associated with the monetary form selected in step 1430, or if the cash out value is adjusted for a benefit in step 1435, the transfer of the cash out value is completed in the monetary form selected in step 1440.

Figure 15:
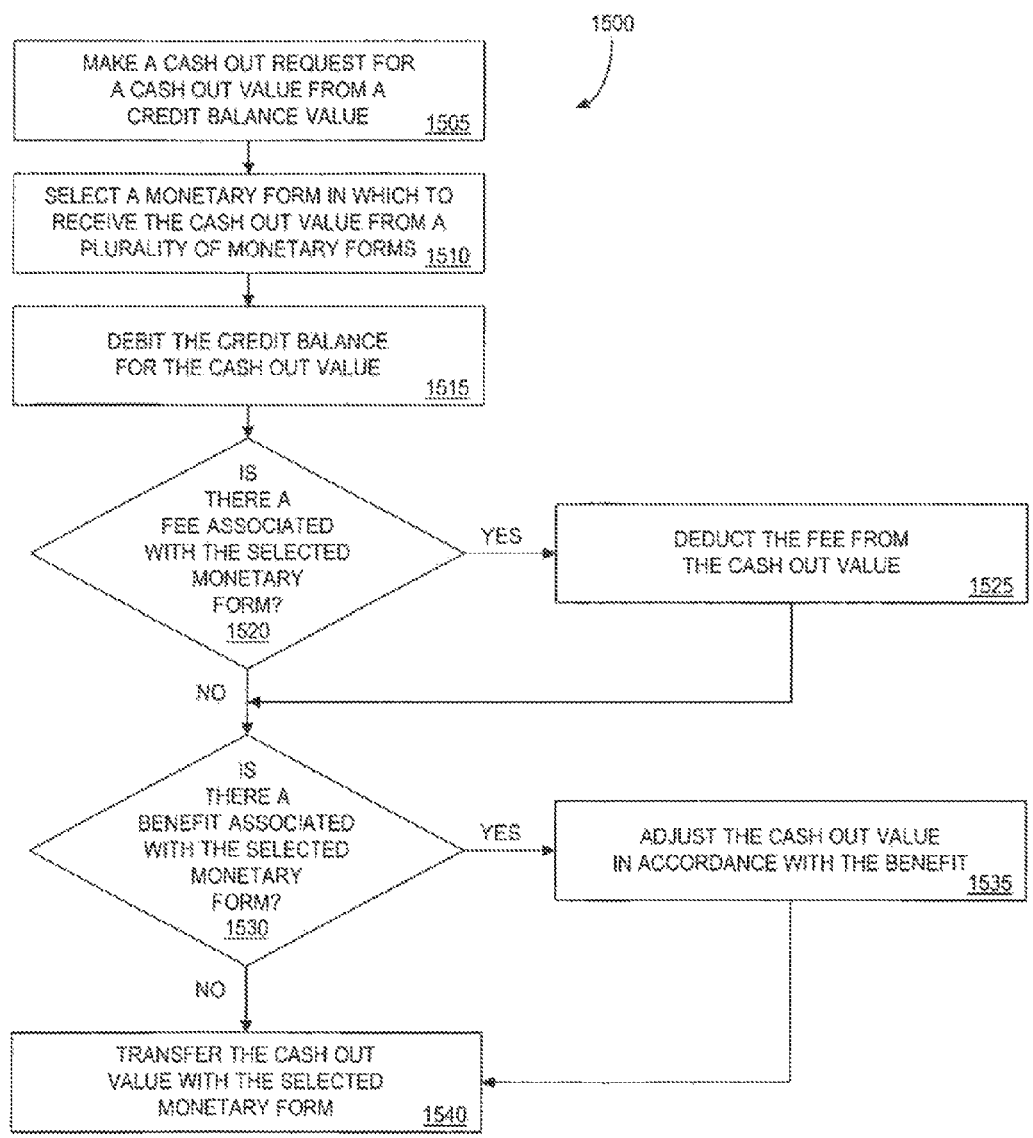
FIG. 15 is a flow chart illustrating a fourth embodiment of a process for dispensing monetary output.

Turning to FIG. 15, an alternate cash out embodiment is illustrated. The process 1500 begins with a cash out request made by a player for a cash out value from a credit balance on the gaming device in step 1505. The player is then prompted by the gaming device to select a monetary form from a plurality of monetary forms in which to receive the cash out value requested in step 1510. In step 1515, the credit balance is debited for the cash out value. In step 1520 the gaming device determines if a fee is required for the monetary form selected. If a fee is required, it is debited from the cash out value in step 1525.

In either case, once the credit balance has been adjusted, a determination is made whether a benefit/bonus is associated with the monetary form selected in step 1530. If a benefit is associated with the monetary form selected, the cash out value is adjusted for the benefit in step 1535. If there is no benefit associated with the monetary form selected in step 1530, the transfer of the cash out value is completed in the monetary form selected in step 1540.

For ease of description, a single balance meter on a gaming device is addressed to describe the flow processes presented above. It should be understood, however, that these processes could be applied to a gaming device with multiple credit meters with multiple credit balances. Further, it should be understood that the entire credit balance on the credit meter need not be cashed out in its entirety. Rather, the player may decide to cash out only a portion of the available credit meter balance.

Although the above embodiments provide examples of both benefits and expenses associated with the selection of specific cash out forms, any combination of benefits, expenses, or benefits and expenses could be applied to the various forms of cash outs available to the player.

It should be understood that although the player's selection of a cash out form has been limited to discussing only the selection of one monetary form for the cash out, it is possible that the player may be allowed, in at least one embodiment, to apportion the cash out among a plurality of different cash out forms. For example, a player with a $1000 credit balance may elect to receive a $100 ticket voucher, $5 in coins, and transfer the remaining $895 credit balance to the player's account in a financial institution.

Methods for selective disbursements from a gaming device are described in Applicants' U.S. Pat. No. 6,168,522, filed Mar. 31, 1998, entitled METHOD AND APPARATUS FOR OPERATING A GAMING DEVICE TO DISPENSE A SPECIFIED AMOUNT, which is hereby incorporated by reference in its entirety.

Similarly, although only one credit balance meter has been discussed in relation to player selection of cash out forms, in some embodiments a plurality of credit balance meters can be cashed out simultaneously in cash out forms selected by the player. Likewise, the player may determine the form in which the credit balance on each credit meter is cashed out. Alternately, the sum of the plurality of credit balances may be apportioned to pay out in particular cash out forms.

In an alternate embodiment, a gaming device with a plurality of balances may have associated with each balance a limited—or even only one-monetary form in which a cash out is available. Furthermore, the monetary form available for each of the plurality of balances may have fees or bonuses as a function of the fees and bonus related to the establishment of the credit balance on a particular credit meter.

The gaming device may include software that ensures that the player apportions the available credit balance to bring the credit balance to zero, that all of the appropriate fees are covered by the credit balance, etc. For example, if the player apportions the credit balance among a plurality of cash out forms, the gaming device automatically calculates the remaining credits—to bring the credit balance meter to zero—to be cashed out in the last selected cash out form.

In another embodiment, a player may elect to receive a partial cash out. A partial cash out may allow the player to transfer a portion of the balance on the credit meter (e.g., transferred to a financial institution). This is particularly valuable to players who may have won a large jackpot and are uncomfortable with the value of the jackpot in the seemingly tenuous capture of the electronic credit meter. Accordingly, in one embodiment, the cash out pushbutton may activate the cash out menu screen, which may further query the player to decide between a full or partial cash out. For example, a player with 10,000 credits on the credit meter from a winning jackpot may wish to cash out 9000 credits and continue playing with the remaining 1000 credits on the credit meter. The player may elect a partial cash out, transferring 9000 credits the player's financial institution.

CONCLUSION

Although only a few wagering devices have been discussed, it should be appreciated that any type of gaming device, gaming related devices, and network devices (e.g., a kiosk) can may be used in conjunction with providing and controlling cash outs from these devices. Further, these gaming devices are not limited to the embodiments described (i.e., video gaming devices, such as video slot machines and video poker machines), but can also be applied to other types of gaming devices, such as video roulette machines, video blackjack machines, and the like. Furthermore, it is also possible to employ electro-mechanical gaming devices such as gaming devices with mechanical reels that determine game outcomes as another embodiment that may use the methods and apparatus discussed herein.

Thus, while the present invention has been described in terms of certain embodiments, other embodiments that are apparent to those of skill in the art are also intended to be within the scope of the present invention. Accordingly, the scope of the present invention is intended to be limited only by the claims appended hereto.

The invention is claimed as follows:

1. A gaming system comprising:
   a housing;
   at least one display device supported by the housing;
   a plurality of input devices supported by the housing, said plurality of input devices including:
      (i) an acceptor, and
      (ii) a cashout device;
   at least one processor; and
   at least one memory device which stores a plurality of instructions, which when executed by the at least one processor, cause the at least one processor to operate with the at least one display device and the plurality of input devices to:
      (a) if a physical item is received via the acceptor, establish a wagering credit balance based, at least in part, on a monetary value associated with the received physical item,
      (b) for each of at least one play of a game:
         (i) enable a player to place a wager,
         (ii) modify the wagering credit balance based on the placement of the wager,
         (iii) randomly determine one of a plurality of different outcomes,
         (iv) display the randomly determined outcome,
         (v) determine any award associated with the randomly determined outcome, and
         (vi) display any determined award associated with the randomly determined outcome, and
         (vii) modify the wagering credit balance based on any determined award associated with the randomly determined outcome,
      (c) if a wagering credit balance cash out request associated with transferring any amount of the modified wagering credit balance to a gaming establishment balance associated with the player is received via the cashout device:
         (i) cause a transfer of any amount of the modified wagering credit balance to the gaming establishment balance associated with the player, and
         (ii) provide the player at least one incentive, said at least one incentive being in addition to any provided amount of the modified wagering credit balance and said at least one incentive being selected from the group consisting of: an entry into a lottery, a modification of a paytable employed for at least one subsequent play of the game, an avoidance of an assessment of a fee, and a quantity of player tracking points, and
      (d) if a wagering credit balance cash out request not associated with transferring any amount of the modified wagering credit balance to the gaming establishment balance associated with the player is received:
         (i) provide the player any amount of the modified wagering credit balance, and
         (ii) not provide the player any incentives.

2. The gaming system of claim 1, wherein the transfer of any amount of the modified wagering credit balance to the gaming establishment balance associated with the player includes an electronic funds transfer.

3. The gaming system of claim 1, wherein when executed by the at least one processor, the plurality of instructions cause the at least one processor to enable the player to input an indication of a form of payment at a point in time selected from the group consisting of: when the wagering credit balance cash out request is received and when the physical item associated with the monetary value is received to establish the wagering credit balance.

4. The gaming system of claim 1, wherein at least one of: the wager placed, any displayed awards, and any provided incentives are at least one of: a quantity of monetary credits and a quantity of non-monetary credits.

5. A method of operating a gaming system, said method comprising:
   (a) if a physical item is received via an acceptor, causing at least one processor to execute a plurality of instructions to establish a wagering credit balance based, at least in part, on a monetary value associated with the received physical item, (b) for each of at least one play of a game:
(i) enabling a player to place a wager,
(ii) causing the at least one processor to execute the plurality of instructions to modify the wagering credit balance based on the placement of the wager,
(iii) causing the at least one processor to execute the plurality of instructions to randomly determine one of a plurality of different outcomes,
(iv) causing at least one display device to display the randomly determined outcome,
(v) causing the at least one processor to execute the plurality of instructions to determine any award associated with the randomly determined outcome, and
(vi) causing the at least one display device to display any determined award associated with the randomly determined outcome, and
(vii) causing the at least one processor to execute the plurality of instructions to modify the wagering credit balance based on any determined award associated with the randomly determined outcome, (b) if a wagering credit balance cash out request associated with transferring any amount of the modified wagering credit balance to a gaming establishment balance associated with the player is received via a cashout device:
(i) causing the at least one processor to execute the plurality of instructions to cause a transfer of any amount of the modified wagering credit balance to the gaming establishment balance associated with the player, and
(ii) providing the player at least one incentive, said at least one incentive being in addition to any provided amount of the modified wagering credit balance and said at least one incentive being selected from the group consisting of: an entry into a lottery, a modification of a paytable employed for at least one subsequent play of the game, an avoidance of an assessment of a fee, and a quantity of player tracking points, and (c) if a wagering credit balance cash out request not associated with transferring any amount of the modified wagering credit balance to the gaming establishment balance associated with the player is received:
(i) providing the player any amount of the modified wagering credit balance, and
(ii) not providing the player any incentives.

6. The method of claim 5, wherein the transfer of any amount of the modified wagering credit balance to the gaming establishment balance associated with the player includes an electronic funds transfer.

7. The method of claim 5, which includes enabling the player to input an indication of a form of payment at a point in time selected from the group consisting of: when the wagering credit balance cash out request is received and when the physical item associated with the monetary value is received to establish the wagering credit balance.

8. The method of claim 5, wherein at least one of: the wager placed, any displayed awards, and any provided incentives are at least one of: a quantity of monetary credits and a quantity of non-monetary credits.

9. The method of claim 5, which is provided through a data network.

10. The method of claim 9, wherein the data network is an internet.

11. A gaming system server comprising:
at least one processor; and
at least one memory device which stores a plurality of instructions, which when executed by the at least one processor, cause the at least one processor to:
(a) for each of at least one play of a game:
(i) enable a player to place a wager,
(ii) modify a wagering credit balance based on the placement of the wager, wherein the wagering credit balance is increasable via an acceptor of a physical item associated with a monetary value,
(iii) randomly determine one of a plurality of different outcomes,
(iv) cause at least one display device to display the randomly determined outcome,
(v) determine any award associated with the randomly determined outcome, and
(vi) cause the at least one display device to display any determined award associated with the randomly determined outcome, and
(vii) modify the wagering credit balance based on any determined award associated with the randomly determined outcome, (b) if a wagering credit balance cash out request associated with transferring any amount of the modified wagering credit balance to a gaming establishment balance associated with the player is received via a cashout device:
(i) cause a transfer of any amount of the modified wagering credit balance to the gaming establishment balance associated with the player, and
(ii) provide the player at least one incentive, said at least one incentive being in addition to any provided amount of the modified wagering credit balance and said at least one incentive being selected from the group consisting of: an entry into a lottery, a modification of a paytable employed for at least one subsequent play of the game, an avoidance of an assessment of a fee, and a quantity of player tracking points, and (c) if a wagering credit balance cash out request not associated with transferring any amount of the modified wagering credit balance to the gaming establishment balance associated with the player is received:
(i) provide the player any amount of the modified wagering credit balance, and
(ii) not provide the player any incentives.

12. The gaming system server of claim 11, wherein the transfer of any amount of the modified wagering credit balance to the gaming establishment balance associated with the player includes an electronic funds transfer.

13. The gaming system server of claim 11, wherein when executed by the at least one processor, the plurality of instructions cause the at least one processor to enable the player to input an indication of a form of payment at a point in time selected from the group consisting of: when the wagering credit balance cash out request is received and when the physical item associated with the monetary value is deposited to establish the wagering credit balance.

14. The gaming system server of claim 11, wherein at least one of: the wager placed, any displayed awards, and any provided incentives are at least one of: a quantity of monetary credits and a quantity of non-monetary credits.

* * * * *